(12) United States Patent
Keite-Telgenbuescher et al.

(10) Patent No.: US 8,283,612 B2
(45) Date of Patent: Oct. 9, 2012

(54) HEATED PLANAR ELEMENT

(75) Inventors: Klaus Keite-Telgenbuescher, Hamburg (DE); Monika Junghans, Hamburg (DE); Bernd Dietz, Ammersbek (DE); Udo Dominikat, Wees (DE); Frank Domann, Uetersen (DE); Ute Ellringmann, Hamburg (DE); Veronika Ramm, Soyen (DE)

(73) Assignee: Tesa SE, Hamburg (DE)

( * ) Notice: Subject to any disclaimer, the term of this patent is extended or adjusted under 35 U.S.C. 154(b) by 253 days.

(21) Appl. No.: 12/712,696

(22) Filed: Feb. 25, 2010

(65) Prior Publication Data

US 2010/0213189 A1 Aug. 26, 2010

(30) Foreign Application Priority Data

Feb. 26, 2009 (DE) .......................... 10 2009 010 437

(51) Int. Cl.
  *H05B 3/10* (2006.01)
  *B60L 1/02* (2006.01)
(52) U.S. Cl. ........ 219/548; 219/549; 219/552; 219/553; 219/528; 219/529; 219/203; 219/213; 219/214; 219/219
(58) Field of Classification Search .............. 219/548–9, 219/552–3, 528–9, 203, 213–4, 219
See application file for complete search history.

(56) References Cited

U.S. PATENT DOCUMENTS

| | | | |
|---|---|---|---|
| 4,775,778 A | 10/1988 | van Konynenburg et al. | |
| 6,084,217 A | 7/2000 | Bulgajewski | |
| 6,861,138 B1 | 3/2005 | Pfaff et al. | |
| 2007/0029309 A1* | 2/2007 | Keite-Telgenbuscher et al. | 219/549 |

FOREIGN PATENT DOCUMENTS

| | | |
|---|---|---|
| DE | 1103419 B | 3/1961 |
| DE | 2948350 A1 | 6/1980 |
| DE | 3822891 A1 | 1/1990 |
| DE | 10310722 A1 | 9/2004 |
| DE | 69333316 T2 | 9/2004 |
| DE | 102007004953 A1 | 7/2008 |
| DE | 102007007617 A1 | 8/2008 |
| EP | 0307205 A2 | 3/1989 |
| EP | 0311142 A2 | 4/1989 |
| EP | 0435923 A1 | 7/1991 |
| EP | 0512703 A1 | 11/1992 |
| EP | 0852801 A1 | 7/1998 |
| EP | 1606368 A1 | 12/2005 |
| EP | 2148337 A1 | 1/2010 |
| WO | 2006/122736 A2 | 11/2006 |

OTHER PUBLICATIONS

European Search Report dated Jun. 16, 2010.

* cited by examiner

*Primary Examiner* — Shawntina Fuqua
(74) *Attorney, Agent, or Firm* — Norris McLaughlin & Marcus PA

(57) ABSTRACT

The invention provides a planar element which is intrinsically heatable and which is particularly suitable for attachment to multi-dimensionally curved surfaces. For this purpose the planar element features particularly high deformability, achieved in accordance with the invention through a planar element having a layer sequence comprising a heating layer and a contacting layer, each of these two layers being composed of a polymeric material based on elastomers and/or on plastic polymers which have a particular elongation at break and at the same time a particular tensile elasticity modulus. Furthermore, the invention provides an adhesively bonded assembly comprising a bonding substrate and a planar element of the aforesaid kind, a method of producing a planar element of the aforesaid kind, and the use of such a planar element for heating an adhesively bonded assembly.

18 Claims, 12 Drawing Sheets a)

b)

HEATED PLANAR ELEMENT

The invention relates to a self-adhesive planar element comprising a heating layer and a contacting layer, the heating layer being in contact with one of the two side faces of the contacting layer and being in electrically conducting communication therewith. The heating layer is composed of an intrinsically heatable first polymeric material, formed as a conductor which heats up when an electric current is passed through. The invention further relates to an adhesively bonded assembly comprising a bonding substrate and the above-described planar element, and also to the use of such a planar element for heating an adhesively bonded assembly.

There are many areas where electrical heating is used to heat articles or spaces. In electrical heating, heat in the form of thermal energy is obtained by conversion from electrical energy (including magnetic energy). Electrical heating may fundamentally be based on different technical principles.

Besides the generation of heat on the basis of capacitive or inductive effects or of electromagnetic radiation, heating systems have become established that include a resistance heating element (and are known as resistance heaters). In systems of this kind the thermal energy that comes about when an electric current is passed through the resistance heating element (Joule heat) is utilized. In principle, as the resistance heating element, it is possible here to use any electrical conductor that has a non-zero finite resistance value.

The selection of the resistance heating element is made on the basis of the heat performance to be obtained, which is dependent in turn on the resistance value of the resistance heating element and on the electric current flowing through the resistance heating element, and therefore, in accordance with Ohm's law, on the applied voltage. Consequently the resistance heating element is selected in accordance with the nature of the conduction pathways it contains, as for instance in accordance with its cross-sectional area, length, specific resistance, and thermal load-bearing capacity.

In the automotive industry in particular the use of resistance heaters is on the increase, as for instance for the purpose of heating car seats, windows and external car mirrors. In order to bring about the desired heating in such applications, the simplest systems involve resistance wires laid flatly. The resistance heating elements in other systems are laminar conductors, such as those composed of electrically conducting polymer layers, for example. For instance, laminar resistance heating elements may be bonded, in the form of planar elements, to the reverse of the mirror glass of an external car mirror, these elements joining the mirror glass to a baseplate in the mount of the external car mirror and being contacted extensively via aluminium conductor faces. When a voltage is applied to the resistance heating element, the element heats up as a result of the flow of current. The heat produced is transferred via a double-sided pressure-sensitive adhesive tape to the glass surface of the mirror, which it heats. In this way it is possible to obtain temperatures of 45° C. to 80° C. on the glass surface of the mirror.

A problem, however, which arises with modern external car mirror constructions is that, in addition to the bondable heating element, there are further functionalities to be realized in the external car mirror (for instance, electrochromic dimming of the mirror), whose implementation likewise contributes to the installed depth or overall thickness of the component. As a consequence of such increasingly thick functional and bonding constructions, the increasing thickness being a consequence of the respective functional structures, between the mirror glass itself and the baseplate, the freedom of the designer in the design of the car mirror is significantly restricted and, moreover, the weight of the external car mirror as a whole is increased.

An improvement has been achieved through the realization in a single planar element, in addition to the adhesive tape, of the electrically conducting structures of the heating element as well. A pressure-sensitively adhesive planar element of this kind which is intrinsically heatable and combines the heating function with the adhesion is described in DE 103 10 722 A1. Also known, from DE 10 2007 007 617, is an intrinsically heatable self-adhesive planar structure in which the heating layer also possesses hotmelt adhesion.

A combined planar element of this kind, comprising adhesive tape and heating element, requires a relatively complicated construction, since the individual components of the heating element must be bonded not only to the glass of the mirror but also to the baseplate of the mirror, which in many cases is composed of acrylonitrile/butadiene/styrene (ABS) plastic. The bonding of these different materials imposes particular requirements on the adhesive tape.

In addition to the considerations arising from the materials of the particular substrate, it is necessary with a pressure-sensitive adhesive tape of this kind, which is used to attach a heating element to the mirror plate and that transports the heat from the heating element to the mirror surface, for there to be not only a very high thermal conductivity but also particular adaptations in respect of the thermal shear strength at elevated temperatures and also in respect of the weathering resistance and pressure-sensitive adhesion at low temperatures. This applies likewise to a separate adhesive layer that is provided in the combined planar element for attaching the assembly to the baseplate of the mirror mounting.

Overall, however, the flexibility of a bondable heating element of this kind is low at best, and the element is relatively rigid. Hence the heating element can only be bonded poorly to a curved substrate, since the strength of the heating element opposes deformation with a high mechanical resistance. As a result of this there may be local or complete detachment of the heating element from the bonding substrate, and this reduces or even prevents the transmission of the electrically generated thermal energy to the bonding substrate.

Furthermore, a heating element bonded to a bonding substrate having a curved surface may detach from the substrate when the latter is heated, since the adhesive of the heating element, as well as the substrate, is heated and therefore softens. As a consequence of the high inherent rigidity of conventional bondable heating elements, this may result in splitting of the softened adhesive, which thus detaches from the bonding substrate. Furthermore, the rigidity of the construction of conventional bondable heating elements detracts from the mechanical low-temperature impact strength of a bond between different bonding substrates, such as a mirror with a mirror mount, for instance.

In the case of large and curved substrate surfaces in particular, a problem which arises is that differing gap dimensions occur over the surface as a result of manufacturing tolerances (such as of mirror glass and baseplate, for instance), and often prevent a full-area adhesive bond. These regions, furthermore, may be penetrated by liquid or gaseous media (fluids), such as rainwater or condensation, for example, which may further reduce the strength of the adhesive bond.

The bondability to curved substrates is limited on the one hand by the carrier sheet. Such carrier sheets typically have thicknesses of 75 µm to 250 µm and they serve to improve the mechanical stability of the planar elements (as for instance to provide effective prevention of release of splinters in the event of the mirror fracturing—as anti-splintering protection). A carrier sheet of this kind, however, has the effect of an overall sharp lowering in the flexibility of the planar element, particularly its flexibility in two dimensions.

In addition to the carrier sheet, the conductor surfaces themselves also hinder bonding to a curved substrate, since typically they are composed of comparatively rigid metal layers or of electrically conducting liquid inks, varnishes or printing inks, which may rupture on severe flexing or stretching, with the consequence that electrical contact in these systems is not reliably ensured.

The rigidity of such a construction of conventional bondable planar elements, finally, also reduces the mechanical low-temperature impact strength of the bonds which can be achieved using them between bonding substrates composed of different materials, such as, for instance, the glass surface of a mirror having a mirror mount made of a plastic.

A proposal was therefore made to use a planar element having a contacting layer comprising an at least substantially two-dimensionally extended perforate contacting element. The two-dimensionally perforate form of the contacting element gives it a flexible quality and hence an increased fracture resistance. The contacting element in this case gains in flexibility perpendicular to the principal extent (two-dimensional extent, plane of principal extension) of the planar element, and so the contacting element, in response to a force acting transverse to the principal extent (flexural stress), is movably flexible, without rupturing under the resultant mechanical stress. At the same time, the at least substantially two-dimensional extent of the contacting element ensures that the contact face between the contacting element, which conducts the electrical current, and the heating layer is sufficiently large to ensure extensive heating and so to underpin the primary functionality. As a result of this particular form, a planar element of that kind requires no stabilizing carrier sheet that reduces its flexibility. With a planar element of that kind, therefore, it is possible to obtain the desired flexibility in the case of one-dimensional curvature of the surface of the bonding substrate.

Even when a highly flexible planar element of that kind is used, however, it is not possible to achieve full-area bonding to a surface that is curved in more than one spatial direction, since that necessitates a multi-dimensional deformability on the part of the planar element. Multi-dimensional deformation, however, cannot be achieved without creasing, even with a highly flexible planar element, and so such an element is not suitable for heating surfaces having a three-dimensional contour.

Even in the case of surfaces which are curved in more than one direction, the poor bondability proves to be a particular problem. This relates, for instance, to rearview car mirrors which have a single-piece mirror with an extended field of view, where the mirror has a surface curved in two spatial directions, as in the case, for example, of wide-angle mirrors or close-proximity mirrors. Mirrors of this kind make sense in view of the heightened legal requirements concerning the size of the field of view of a rearview car mirror, since, through the use of a mirror curved in two directions, it is possible to avoid the increase in size of the mirror area that would otherwise be necessary, and to circumvent the associated aerodynamic drawbacks and design restrictions. Even when using a highly flexible planar element, it is not possible to provide such a mirror, having curvature in two dimensions, with sufficiently stable bonding, since here again there is local or complete detachment and also creasing.

It is an object of the present invention, therefore, to provide a planar element which eliminates these disadvantages and which is formed so as to allow effective thermal contact even to a substrate having a two- or three-dimensionally curved surface, while at the same time exhibiting a high bond strength to this substrate, and, moreover, having a simple construction, thereby allowing the planar element to be produced favourably from the standpoints both of economics and of the environment.

This object is achieved, surprisingly and, for the skilled person, in an unforeseeable way, by means of a planar element of the type specified at the outset, in which the contacting layer is composed of an electrically conducting second polymeric material, the first polymeric material and the second polymeric material each being a polymeric material based on elastomers and/or on plastic polymers, and each having, at a stretching velocity of 300 mm/min, an elongation at break of more than 20%, more particularly of more than 50% or even of more than 100%, and further possessing a tensile elasticity modulus of less than 1000 MPa or even of not more than 100 MPa.

A planar element with a construction of this kind is highly deformable and can therefore be adhered even to irregular surfaces. The primary basis for this is the particular form of the heating layer and of the contacting layer which, in accordance with the invention, are both composed of polymeric materials produced on the basis of elastomers and/or of plastic polymers.

Moreover, the two polymeric materials are required to have a particularly high elongation at break and at the same time a particularly low tensile elasticity modulus. The low tensile elasticity modulus makes the polymeric materials sufficiently pliant. At the same time, however, they must also have a high elongation at break, in order to be able to be deformed non-destructively overall. Only polymeric materials in which the two features according to the invention are realized simultaneously are deformable to a sufficient extent in order to be able, without any limitation on functionality, to conform to the contours of the bonding substrate and hence to allow bonding even to substrates whose surface is not flat. A consequence of this, moreover, is that the planar element is able as well to compensate minor unevennesses in the surface of the substrate.

As a result of this form, the planar element gains in elasticity parallel to its principal extent (plane of principal extension), and so, in response to a force acting parallel to the principal extent, it is movably elastic, without rupturing under the resultant mechanical stress. If the low tensile elasticity modulus were higher, in contrast, the planar element would become too rigid, whereas a lower elongation at break would result in an inadequate deformability overall.

It is of advantage if, in addition to the features of one or more of the aforementioned forms, the first polymeric material and/or the second polymeric material are/is a self-adhesive. In this way it is possible, in respect of the planar element, to do without additional layers of self-adhesive, allowing planar elements having a particularly simple construction to be produced, and having a low installed height and at the same time permitting particularly good heat transport.

In this context it has proved, furthermore, to be favourable for the first polymeric material and/or the second polymeric material to be a pressure-sensitive adhesive. Systems of this kind permit particularly simple bonding, without the need for other operating steps such as heating the planar elements, for instance, with the consequence that self-adhesives of this kind can be used even in the case of a substrate that has a highly irregular geometry or is heat-sensitive.

Pressure-sensitive adhesives (PSAs) which have emerged as being advantageous are more particularly those based on acrylates and/or methacrylates, polyurethanes, natural rubbers, synthetic rubbers and/or silicones. PSAs of this kind afford the advantage that the technical adhesive properties of the planar element can be controlled to a broad extent and hence can be tailored to the specific conditions of the bond to be produced, in respect, for instance, of the particular substrate or the ambient conditions.

Instead, the first polymeric material and/or the second polymeric material may also favourably be a hotmelt adhesive. By means of such a hotmelt adhesive it is possible to obtain a particularly high bond strength, and hence such systems are employed in particular where the adhesive bond is subject to high mechanical loads. This, of course, does not rule out one of the two polymeric materials (first polymeric material and second polymeric material) being a pressure-sensitive adhesive and the other of the two polymeric materials being a hotmelt adhesive.

Hotmelt adhesives which have emerged as being advantageous are more particularly those based on polyolefins and copolymers of polyolefins and also on their acid-modified derivatives, on ionomers, on thermoplastic polyurethanes, on polyamides and their copolymers, and on block copolymers such as styrene block copolymers. With the aid of these adhesive systems it is possible to control the technical adhesive properties of the planar element to a particularly broad degree in conjunction with high bond strength, and hence to tailor them to the specific circumstances of the bond to be produced. Hence a planar element having a particularly high bond strength is obtained which is suitable even for the bonding of heavy elements or elements subject to high mechanical load, and elements whose technical adhesive properties can likewise be varied over a wide range.

In addition to the features of one or more of the aforementioned forms, the planar element may further comprise a layer of adhesive comprising a self-adhesive which is in contact with the other of the two side faces of the contacting layer. In this way the technical adhesive properties of the planar element overall can be decoupled from the properties of the polymeric material of the contacting layer. Hence it is possible to achieve a particularly high bonding stability overall, since the adhesives on the self-adhesive side faces of the planar element can be adjusted individually to the particular bond substrate and at the same time the contacting layer can be adapted for particularly good anchorage on the heating layer, a factor which is important especially when the material of the surface of the contacting layer is very different from the material of the surface of the bond substrate.

For the realization of the invention it is particularly advantageous if, in addition to the features of one or more of the aforementioned forms, the first polymeric material is a posistor. A posistor (PTC element) is a resistance heating element whose current-conducting regions are composed of a material which in terms of its electrical resistance exhibits a positive temperature coefficient (PTC). Posistors, accordingly, are materials which conduct electrical current and whose resistance increases with temperature, and therefore conduct current more effectively at low temperatures than at high temperatures. The use of materials of this kind with posistor behaviour as resistance heating elements (PTC elements) affords the practical advantage that, when a constant voltage is applied to such a heating element, the overheating of the heating element is prevented, since, in the event of an increase in the operating temperature, there is an increase in the resistance of the heating element, thereby reducing the current—in accordance with Ohm's law—in proportion with the increase in resistance; the heating output achieved overall goes down, and the heating element cools down again. Depending on the specific application, such intrinsic temperature limitation may be employed instead of or in addition to external regulation.

It has further proved to be advantageous if, in addition to the features of one or more of the aforementioned forms, the second polymeric material is not a posistor. This allows a uniform distribution of voltage over the area of the contacting layer to be achieved, resulting in a homogeneous distribution of temperature in the planar element.

It is further advantageous if, in addition to the features of one or more of the aforementioned forms, the electrical resistance of the contacting layer is less than one tenth of the electrical resistance of the heating layer, preferably also less than one hundredth or even less than this. As a result of this form, the voltage applied overall to the heating element falls predominantly on the heating layer and not on the contacting layer, with the consequence that the development of heat takes place at least substantially in the region of the heating element. As a result of this, heat development is uniform over the entire two-dimensional extent of the planar element, the amount of heat generated in the contacting layer itself being kept at a low level.

Furthermore, the planar element may have a form in which, in addition to the features of one or more of the aforementioned forms, the electrical resistance of the contacting layer, in the event of stretching of the contacting layer by more than 20%, more particularly by more than 50% or even by more than 100%, goes up by not more than three times, and more particularly does not increase. Where the contacting layer comprises an electrically conducting filler at a high mass fraction (i.e. in the case of a highly filled second polymeric material), the conductivity of the contacting layer on stretching may increase, given a suitable choice of material, with a consequent overall reduction in the resistance; such materials and combinations of materials are known to the skilled person. This embodiment ensures that, even in the case of local stretching of the planar element, there is no considerable local increase in resistance. This prevents the situation in which, on the basis of a locally higher drop in voltage in the stretched region, the flow of current is low, which would result in the share of the stretched regions in the development of heat being low as well. Accordingly, this embodiment ensures that the development of heat in the planar element does in fact take place extensively, and ideally even over the full area.

It may further be of advantage if, in addition to the features of one or more of the aforementioned forms, the contacting layer has a branched comb structure or finger structure. A form of this kind allows optimum utilization of virtually the entire area of the planar element for heat generation with only small perforations, without significantly adversely affecting the mechanical properties or raising the likelihood of a sharp drop in voltage over the layer. In the case of a comb structure and in the case of a finger structure (interdigital structure), individual teeth or fingers branch off from a main strand. The main strand in this case may have a larger cross section than the teeth or fingers, or else may have the same cross section. The difference between a comb structure and a finger structure is that, in the case of a comb structure, the elements that branch off are disposed on the same side of the main strand, whereas, in the case of a finger structure, they branch off from different sides. Both structures may have either single or multiple branches and both regular and irregular arrangements, and can be employed when the contacting layer is formed as a single electrode or when the contacting layer is formed as a plurality of electrodes.

It is useful, moreover, if the first polymeric material and/or the second polymeric material, in addition to the features of one or more of the aforementioned forms, comprise/comprises at least one electrically conducting filler. In this way it is possible with particular ease and cost-effectiveness to obtain an electrically conducting polymeric material which affords a heating output that is sufficiently high for numerous applications. It is particularly advantageous in this context if the electrically conducting filler is selected from the group encompassing graphite, carbon nanoparticles and carbon black, more particularly conductive carbon black. The advantage of such a composition is that these fillers exhibit particularly good connection to the polymer matrix, and so a polymeric material of this kind overall possesses a high cohesion and hence a high mechanical load-bearing capacity. It is preferred here to employ particles which have a tendency towards automatic network formation (aggregation), examples being carbon blacks, carbon nanotubes or other nanoparticulate systems. A self-forming network of this kind will be less negatively affected in its conductivity on stretching than in the case of electrically conducting fillers present in an isolated form in the polymeric material.

It is of advantage, further, if the planar element, in addition to the aforementioned features, is of carrier-free form, in other words has no permanent carrier. This produces a planar element having a particularly high flexibility and elasticity, allowing extremely small installed depths to be realized on the part of the planar element. Instead, the planar element may also comprise a permanent carrier, which, at a stretching velocity of 300 mm/min, has an elongation at break of more than 20%, more particularly of more than 50% or even of more than 100%, and further has a tensile elasticity modulus of less than 1000 MPa or even of not more than 100 MPa. Through the use of a permanent carrier of this kind with high elasticity, a highly stable planar element is obtained which is outstandingly suitable for bonding to uneven surfaces and also to surfaces which are bent in more than one spatial direction (multi-dimensionally curved).

A further aspect of the present invention proposes an adhesively bonded assembly comprising a bonding substrate and one of the aforementioned planar elements.

A disadvantage of the adhesively bonded assemblies known to date is that on multi-dimensionally curved surfaces they cannot be adhered with reliable permanence, since, as a consequence of the inherent rigidity of the self-adhesive planar elements bonded thereto on one side, it is possible for detachment to occur from the curved surface. This disadvantage is avoided through the use of the planar element of the invention. This is favourable in particular when the adhesively bonded assembly comprises an assembly of at least one double-sidedly self-adhesive planar element and a viewing sheet or mirror sheet as a bonding substrate, since in systems of this kind, owing to the high inherent weight of the bonding substrate, detachment of the bonding substrate from the mount, and the potentially resultant destruction of the bonding substrate, would be a particular problem.

The present invention further proposes the use of the above-described planar element for the bonding of bonding substrates in the automotive industry, more particularly for the heating of the aforementioned adhesively bonded assembly. Where an adhesively bonded assembly of the existing type is bonded on a bonding substrate having an irregularly shaped or multi-dimensionally curved surface and then intrinsically heated in the manner intended, the warming of the polymeric material is accompanied by a softening of the polymeric material and hence also by a decrease in the cohesion of the polymeric material, which may lead to the splitting of the softened polymeric material, with the consequence of the adhesively bonded assembly undergoing at least partial detachment from the bonding substrate. This disadvantage is avoided through use of the planar element of the invention to heat the adhesively bonded assembly.

Unless indicated otherwise, the individual advantageous embodiments can be combined with one another as desired and can be used to obtain the advantageous effects described above and also others; these features are therefore also considered protectable per se in combination with the features of the independent claims.

Given below, for the purpose of illustrating the invention, is a general description of the invention, including a description of certain representative examples of individual constituents of part-aspects of the invention, which may be linked with one another almost arbitrarily as a function of the particular properties desired.

The invention basically provides a self-adhesive planar element. A planar element for the purposes of this specification is considered to encompass more particularly all customary and suitable structures having an at least substantially sheetlike extent. They enable a two-dimensional bond and may be of various embodiments, more particularly, flexible, in the form of an adhesive sheet, adhesive tape, adhesive label or shaped diecut. "At least substantially sheetlike extent" means that the subregions of which the planar element is composed are present in a two-dimensional arrangement, with it also being possible for individual subregions to protrude from this two-dimensional arrangement.

This planar element, furthermore, is a self-adhesive planar element. This means that at least one of the side faces of the planar element, disposed parallel to its principal extent, or even both side faces, is or are self-adhesive and thus has or have, at least partially, a self-adhesive.

Self-adhesives in the present context include without exception all adhesives based on pressure-sensitive adhesives and/or hotmelt adhesives, i.e. adhesives which inherently permit permanent bonding to the substrate (adhesion substrate or bond substrate). "Based on" or "on the basis of" denotes in the present context that the technical adhesive properties of this adhesive system are dependent at least to a large extent on the fundamental properties of this adhesive or of these adhesive constituents (referred to as the base polymer), and describes more particularly those adhesive systems whose polymeric phase is present in the said adhesive or said adhesive constituents to a level of at least 40% by weight. This, of course, does not rule out the fundamental properties of the adhesive or adhesive constituents being additionally influenced through use of modifying auxiliaries or additives or of further polymeric adhesives in the adhesive system.

In accordance with the invention the planar element comprises at least two different layers: a heating layer and a contacting layer. Designated a layer, more particularly, is a sheetlike arrangement of a system of unitary functionality, whose dimension in one spatial direction is significantly lower than in the two other spatial directions, which define the principal extent. Such a layer may be of compact or else of perforate design, and may be composed of a single material or of different materials, the latter able to be the case more particularly when these materials contribute to the unitary functionality of this layer. A layer may have a constant thickness over its whole planar extent, or else different thicknesses. Furthermore, of course, one layer may also have more than one single functionality.

In the planar element of the invention there is provision for a defined layer sequence. A layer sequence is more particularly a spatial arrangement of individual layers which are arranged perpendicular to their principal extent above one another (in stack form) and are each in direct contact with one another without other layers in between. Within the layer sequence of the invention, a contacting layer is disposed directly on a heating layer.

A heating layer is any layer set up for the heating of the planar element. A contacting layer is any layer which is a good conductor of electrical current and can be used to apply a voltage to the heating layer and/or to pass a current through at least a subregion of the heating layer; the contacting layer serves, accordingly, to connect external electrical supply lines to the planar element (contacting electrode function).

Accordingly the heating layer is in contact with one of the two side faces of the contacting layer (i.e. the top face or the bottom face of the contacting layer), and hence these two layers are in direct—that is, immediate—contact. Moreover, the heating layer is in electrically conducting connection with this side face of the contacting layer. A connection is termed electrically conducting especially when the overall electrical resistance of the connection, which is made up of the resistances of the sub-sections to be connected and of the contact resistance of the connection, is of a magnitude not more than three times that of the overall resistances of the remaining conducting regions and contacts.

The contacting layer is an electrically conducting connection between the heating layer and the current source or voltage source (which typically provides a voltage of up to 50 V, it also being possible for the selected operating voltage to be higher in speciality applications). The contacting layer here may be formed either as one of the two electrode connections (poles) of the heating layer, or else may form both electrode connections. Where the contacting layer constitutes only one of the two electrode connections of the heating layer, a second electrode connection is necessary in order to allow a current to flow through the heating layer and for the heating layer to warm up. This second electrode connection in this case may be formed within the planar element of the invention—in the form of an additional, second flexible contacting layer, for instance—or else may be provided on one of the two bonding substrates, for example as a metallic layer on the surface of a piece of glass (as the silver layer of a mirror, for instance). In this case there would be a flow of current through the heating layer primarily in a direction perpendicular to the principal extent.

Where, on the other hand, the contacting layer constitutes both electrode connections of the heating layer, the contacting layer thus comprises at least two regions which are not in conducting connection with one another and which are formed as two electrode leads (poles) of the heating layer. In this arrangement, in addition to or instead of the perpendicular flow of current, there may be a lateral flow of current within the principal extent. The contacting layer may typically have a thickness of less than 100 μm, preferably of less than 20 μm and more preferably of less than 10 μm.

In accordance with the invention the heating layer is composed of an intrinsically heatable first polymeric material and the contacting layer of an electrically conducting second polymeric material. A polymeric material means any composition which comprises at least one base polymer. Further to this base polymer, a polymeric material may optionally additionally include further constituents, such as further polymers or additives. Both the heating layer and the contacting layer may be present in any suitable arrangements—for example, as a full-area continuous layer or as a specially shaped structure, for instance as a comb structure or finger structure.

The base polymer of a polymeric material is a polymer whose properties dominate some or even all of the properties of the polymer composition as a whole, it of course being not impossible for the properties of the polymeric material to additionally be influenced by use of modifying auxiliaries or additives or of further polymers in the composition. In particular this may mean that the fraction of the base polymer as a proportion of the overall mass of the polymeric phase of the polymeric material (and hence, where appropriate, also of the polymeric phase of the adhesive) is more than 50% by weight and/or that the fraction of the base polymer as a proportion of the overall mass of the polymeric material is more than 20% by weight. Where the polymeric material contains only one single polymer, then that polymer is of course the base polymer.

An intrinsically heatable polymeric material is any polymeric material which is inherently heatable, which means that this polymeric material, without further components or structural parts, has the capacity to produce heat itself when an electrical current is passed through the polymeric material or when an electrical voltage is applied to the polymeric material, it being of no consequence whether the current or voltage is an alternating current or voltage or else a direct current or voltage. The process which takes place for the generation of heat is typically a repeatable process, such as heating on the basis of electrical resistance of the polymeric material, for example. In accordance with the invention, however, the generation of heat may also be realized differently, for instance as a one-off process, for example an exothermic irreversible chemical reaction which can be initiated electrically.

For the realization of the present invention, however, it is absolutely necessary for the planar element overall to be deformable. This is achieved by the planar element having particular deformable layers. The deformability of the heating layer and of the contacting layer is a result of the use of defined polymeric materials which form the heating layer and the contacting layer, respectively. Hence it is necessary, first, for both polymeric materials, the first polymeric material and the second polymeric material, to be polymeric materials based on elastomers and/or on plastic polymers.

Elastomers are polymers which are elastically deformable while retaining their shape, with a glass transition temperature below room temperature. A body made from an elastomer undergoes elastic deformation under an acting deformation force, but returns to its original non-deformed shape when the deformation force ceases. For the purposes of the specification, this likewise includes viscoelastic polymers, which possess a behaviour which is partly elastic and partly viscous, with the consequence that the body, after the deformation force is gone, re-adopts its original shape only partly (incompletely), and the remaining deformation energy is then broken down within a viscous flow process.

The term "plastic polymer" refers to polymers which undergo plastic deformation under an acting deformation force, the deformation being retained completely or at least partly even after the deformation force has ceased.

Furthermore, the polymeric materials are required to have, in each case at a stretching velocity of 300 mm/min, an elongation at break of more than 20%, more particularly of more than 50% or even of more than 100%, and further to possess a tensile elasticity modulus of less than 1000 MPa or even of not more than 100 MPa.

The elongation at break (break elongation) is a numerical characteristic of the mechanical load-bearing capacity and deformability of materials. This characteristic figure indicates the remanent percentage change in length of a specimen (relative to its initial length) which it has when it breaks as a result of mechanical overloading.

The tensile elasticity modulus (modulus of elasticity, tensile modulus, elasticity coefficient, Young's modulus) is a material characteristic value by means of which the relation between stress and strain is described in the deformation of a material having linearly elastic behaviour. In the case of materials with non-linearly elastic behaviour, the tensile elasticity modulus is understood for the present purposes to be the initial tensile elasticity modulus when the tensile loading is commenced. The greater the resistance presented by a material to its deformation, the greater the value of the elasticity modulus. The rigidity of a specific body composed of this material is additionally dependent on the processing and on the geometry of the body.

Elongation at break and tensile elasticity modulus are determined in accordance with DIN EN ISO 527-3 at room temperature with a defined sample body (type 5) for a stretching velocity of 300 mm/min.

From these properties, which are mandatory for the realization of the present invention, it is evident that neither the heating layer nor the contacting layer may have continuous metallic structures (for instance, wire leads, electrodes or heating wires), since the inherent rigidity of these structures would be an excessive restriction on the extensibility of the layers, and so the required deformability would be absent.

For the preferred case of a layer used as a resistance heater, this layer may have an electrical resistance which on the one hand is high enough to allow heating of the layer but on the other hand is low enough to establish a flow of current through the layer to start with.

For the realization of the present invention it is possible in principle, as first polymeric material and as second polymeric material, to employ all polymeric materials which have a sufficient electrical conductivity and conduct an electrical current flowing through said polymeric material with substantially no breakdown, and which, moreover, have the features required in accordance with the invention, particularly with regard to their elongation at break and to their tensile elasticity modulus. Polymeric materials with such elongation at break and such tensile elasticity modulus are well known to the skilled person; with regard to the other required properties—the electrical conductivity, for instance—they may be adapted by means of measures which are likewise well known to the skilled person.

Hence, on the basis of their mechanical and thermal properties, polymeric materials which are particularly suitable as first polymeric material and as second polymeric material are, for example, those polymeric materials whose base polymers are fluoropolymers, chloropolymers, silicones, polyamides, polyolefins and their copolymers, polyarylenes, polyacrylonitriles, ethylene-propene-diene-monomer rubbers (EPDM), nitrile rubbers and mixtures or copolymers of these. Especially suitable are elastomers based on the stated types of polymer, although waxes can also be used. In this context it is possible to set the elastic properties and plastic properties deliberately by means of adjuvants such as, for example, solvents, plasticizers, resins, crosslinkers, blowing agents and/or fillers.

More particularly the first polymeric material and the second polymeric material may comprise at least one adhesive, and so the polymeric materials are adhesive polymeric materials (adhesives). Among these, mention may be made more particularly of self-adhesives, in other words pressure-sensitive adhesives and hotmelt adhesives.

Pressure-sensitive adhesives (PSAs) are adhesives which allow permanent bonding to the substrate at room temperature even under a relatively weak applied pressure. In contrast, hotmelt adhesives are adhesives which enter into a permanent bond with the substrate only at elevated temperatures, the resulting bond being maintained even on subsequent cooling of the bond to room temperature. The bondability of both PSAs and hotmelts derives from their adhesional properties.

Adhesion typically refers to the physical effect brought about by the holding-together of two phases, brought into contact with one another, at their interface on account of intermolecular interactions that occur there. Adhesion therefore defines the attachment of the adhesive to the substrate surface and can be determined as tack and as bond strength. In order to influence the adhesion of an adhesive in a specific way, it is common to add plasticizers and/or bond strength-increasing resins (referred to as tackifiers) to the adhesive.

Cohesion typically refers to the physical effect which results in the internal holding-together of a substance or composition on account of intermolecular and/or intramolecular interactions. The forces of cohesion therefore determine the consistency and fluidity of the adhesive, which can be determined, for instance, as viscosity and as holding power. In order to increase the cohesion of an adhesive in a specific way, it is often subjected to additional crosslinking, for which reactive (and hence crosslinkable) constituents or other chemical crosslinkers are added to the adhesive, and/or the adhesive is subjected to actinic (high-energy) radiation in an aftertreatment.

The technical adhesive properties of a pressure-sensitive adhesive are determined primarily by the relationship between adhesional and cohesional properties. For certain applications, for example, it is therefore important that the adhesives used are highly cohesive, i.e. possess a particularly strong internal holding-together, whereas for other applications a particularly high adhesion is required.

Optionally either one of the two polymeric materials or else both polymeric materials may be PSAs. Instead, one of the two polymeric materials or else both polymeric materials may be hotmelts. In this context it is of course also possible for one of the two adhesives to be a PSA and the other a hotmelt, in other words either for the first polymeric material to be a PSA and the second polymeric material to be a hotmelt, or for the first polymeric material to be a hotmelt and the second polymeric material a PSA.

Suitable PSAs include in principle all PSA systems having suitable pressure-sensitive adhesive properties, in other words pressure-sensitively adhesive systems. The monomers that serve for preparing the PSAs are selected more particularly in such a way that the resulting polymers can be used as PSAs at room temperature or higher temperatures.

An adhesive is pressure-sensitively adhesive in the sense of the present invention if it possesses pressure-sensitive adhesive properties in accordance with the "Handbook of Pressure Sensitive Adhesive Technology" by Donatas Satas (van Nostrand, New York 1989).

In order to achieve a polymer glass transition temperature, $T_g$, of $T_g \leq 25°$ C., which is preferred for PSAs, the monomers are typically selected such, and the quantitative composition of the monomer mixture selected such, that they behave in such a way, in analogy to the equation presented by Fox (cf. T. G. Fox, Bull. Am. Phys. Soc. 1 (1956) 123), that the desired value for the glass transition temperature $T_g$ of the resulting polymer is given by $$\frac{1}{T_g} = \sum_n \frac{w_n}{T_{g,n}} \quad \text{(E1)}$$

In this equation, n represents the serial number of the monomers used, $w_n$ the mass fraction of the respective monomer n (% by weight) and $T_{g,n}$ the respective glass transition temperature of the homopolymer of the respective monomer n, in K.

Examples of PSAs suitable for the first polymeric material and/or the second polymeric material are therefore PSAs based on acrylates and/or methacrylates, natural rubbers and/or synthetic rubbers.

Therefore it is possible to use PSAs based on acrylic acid and/or methacrylic acid and/or based on esters of the aforementioned compounds, or those based on hydrogenated natural or synthetic rubbers, on account of their particular ageing stability and hence their capacity to withstand repeated heating operations of the planar element of the invention over a long time.

Suitable more particularly are acrylate PSAs which are obtainable, for instance, by free-radical polymerization and which are based at least partly on at least one acrylic monomer of the general formula $CH_2=C(R^1)(COOR^2)$, where $R^1$ is H or a $CH_3$ radical and $R^2$ is H or is selected from the group consisting of saturated, unbranched and branched, substituted and unsubstituted $C_1$ to $C_{30}$ alkyl radicals. The at least one acrylic monomer ought to have a mass fraction of at least 50% by weight in the polymeric phase of the PSA.

According to one particularly advantageous embodiment it is possible further to use polymers which (a1) are based at least partly on at least one acrylic monomer of the general formula $CH_2=C(R^1)(COOR^{2'})$, where $R^1$ is H or a $CH_3$ radical and $R^{2'}$ is selected from the group consisting of saturated, unbranched and branched, substituted and unsubstituted $C_2$ to $C_{20}$ alkyl radicals, and (a2) are based at least partly on a comonomer which is polymerizable with the at least one acrylic monomer and may be selected in particular from vinyl compounds having functional groups, maleic anhydride, styrene, styrene compounds, vinyl acetate, acrylamides, and photoinitiators functionalized with a double bond.

Preferably the at least one acrylic monomer (a1) here has a mass fraction of 65% to 100% by weight and the at least one comonomer (a2) has a mass fraction of 0% to 35% by weight in the polymeric phase of the self-adhesive.

Furthermore, an average molecular mass $M_W$ (weight average) of the self-adhesive of not more than 800,000 g/mol has proved to be advantageous, particularly with regard to the desired mechanical properties of the PSA.

According to a further embodiment the at least one self-adhesive may also comprise or be based on natural or synthetic rubber compositions. For a self-adhesive comprising natural rubber, the natural rubber is ground to a freely selectable molecular weight and then additized with bond strength enhancing fillers (tackifier resins, for example) and also with electrically conducting fillers. For one particular embodiment it is also possible for partially crystalline polymers such as EVA (ethylene-vinyl acetate) to be used as the self-adhesive or to be added thereto.

It is preferred to use acrylic or methacrylic monomers of the general formula $CH_2=C(R^1)(COOR^{2''})$ which comprise acrylic and methacrylic esters, the group $R^1$ being selected from the compounds already described above and the group $R^{2''}$ being selected from the group consisting of saturated, unbranched and branched, substituted and unsubstituted $C_4$ to $C_{14}$ alkyl radicals, more particularly $C_4$ to $C_9$ alkyl radicals. Specific examples, without wishing to be restricted by this enumeration, are methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate and their branched isomers, examples being isobutyl acrylate, 2-ethylhexyl acrylate, 2-ethylhexyl methacrylate, isooctyl acrylate or isooctyl methacrylate.

Further classes of compound which can be used are monofunctional acrylates and/or methacrylates of the general formula $CH_2=C(R^1)(COOR^{2'''})$, the group $R^1$ being selected from the compounds already described above and the group $R^{2'''}$ being selected from the group of bridged and unbridged cycloalkyl radicals having at least 6 C atoms. The cycloalkyl radicals may also be substituted, for example by $C_1$ to $C_6$ alkyl groups, halogen atoms or cyano groups. Specific examples are cyclohexyl methacrylate, isobornyl acrylate, isobornyl methacrylate and 3,5-dimethyladamantyl acrylate.

In one preferred procedure, acrylic monomers and/or comonomers are used which contain one or more substituents, more particularly polar substituents, examples being carboxyl, sulphonic acid, phosphonic acid, hydroxyl, lactam, lactone, N-substituted amide, N-substituted amine, carbamate, epoxy, thiol, alkoxy, cyano, halide and ether groups.

Suitable with great advantage in the sense of acrylic monomer (a1) are monomers which are selected from the following group: substituted and unsubstituted compounds encompassing methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, isobutyl acrylate, 2-ethylhexyl acrylate, 2-ethylhexyl methacrylate, isooctyl acrylate, isooctyl methacrylate, cyclohexyl methacrylate, isobornyl acrylate, isobornyl methacrylate and 3,5-dimethyladamantyl acrylate.

Likewise suitable are moderately basic comonomers (a2) such as singly or doubly N-alkyl-substituted amides, more particularly acrylamides. Specific examples here are N,N-dimethylacrylamide, N,N-dimethylmethacrylamide, N-tert-butylacrylamide, N-vinylpyrrolidone, N-vinyllactam, dimethylaminoethyl acrylate, dimethylaminoethyl methacrylate, diethylaminoethyl acrylate, diethylaminoethyl methacrylate, N-methylolacrylamide, N-methylolmethacrylamide, N-(butoxymethyl)methacrylamide, N-(ethoxymethyl)acrylamide, N-isopropylacrylamide, this enumeration as well not being conclusive.

Further preferred examples of comonomers (a2) are hydroxyethyl acrylate, hydroxyethyl methacrylate, hydroxypropyl acrylate, hydroxypropyl methacrylate, allyl alcohol, maleic anhydride, itaconic anhydride, itaconic acid, glycerydyl methacrylate, phenoxyethyl acrylate, phenoxyethyl methacrylate, 2-butoxyethyl acrylate, 2-butoxyethyl methacrylate, cyanoethyl acrylate, cyanoethyl methacrylate, glyceryl methacrylate, 6-hydroxyhexyl methacrylate, vinylacetic acid, tetrahydrofurfuryl acrylate, beta-acryloyloxypropionic acid, trichloroacrylic acid, fumaric acid, crotonic acid, aconitic acid, dimethylacrylic acid, this enumeration not being conclusive.

In a further preferred procedure, use is made as comonomers (a2) of vinyl compounds, more particularly vinyl esters, vinyl ethers, vinyl halides, vinylidene halides, vinyl compounds with aromatic rings and heterocycles in alpha position, examples that may be mentioned including—not exclusively—vinyl acetate, vinylformamide, vinylpyridine, ethyl vinyl ether, vinyl chloride, vinylidene chloride, styrene and acrylonitrile, for instance.

With particular advantage the at least one comonomer (a2) may be a photoinitiator having a copolymerizable double bond, selected more particularly from the group containing Norrish I photoinitiators or Norrish II photoinitiators, benzoin acrylates or acrylated benzophenones.

In a further preferred procedure, the comonomers (a2) described are admixed with additional monomers which possess a high static glass transition temperature. Suitable such additional monomers include aromatic vinyl compounds such as, for instance, styrene, in which case preferably the aromatic rings are composed of $C_4$ to $C_{18}$ units and can also contain heteroatoms. Particularly preferred examples are 4-vinylpyridine, N-vinylphthalimide, methylstyrene, 3,4-dimethoxystyrene, 4-vinylbenzoic acid, benzyl acrylate, benzyl methacrylate, phenyl acrylate, phenyl methacrylate, tert-butylphenyl acrylate, tert-butylphenyl methacrylate, 4-biphenylyl acrylate and 4-biphenylyl methacrylate, 2-naphthyl acrylate and 2-naphthyl methacrylate, and also mixtures of these monomers, this enumeration again being not conclusive.

Instead of or in addition to PSAs, the planar element of the invention may comprise hotmelt adhesives for the first polymeric material and/or for the second polymeric material. Suitable hotmelt adhesives include in principle all hotmelt adhesive systems having suitable hotmelt-adhesive properties, in other words systems with hotmelt tack. A planar element with hotmelt tack for the purposes of the present invention is a planar element of the invention where, following application in melt form to the substrate and subsequent cooling, the bond strength at room temperature in accordance with ASTM D 3330-04 (with a removal speed of 300 mm/min on the bond substrate) is greater than 1 N/cm, more particularly greater than 3 N/cm or even greater than 5 N/cm.

Hotmelt adhesives which can be used are all customary and suitable hotmelt adhesives, examples being those based on polyolefins and copolymers of polyolefins and also their acid-modified derivatives, ionomers, polyamides and their copolymers, and also block copolymers such as styrene block copolymers.

A polymeric material, more particularly a self-adhesive, may of course comprise further formulating ingredients and/or adjuvants such as, for example, auxiliaries, pigments, rheological additives, adhesion promoter additives, plasticizers, resins, elastomers, ageing inhibitors (antioxidants), light stabilizers, UV absorbers and also other auxiliaries and additives, examples being driers (for instance, molecular sieve zeolites or calcium oxide), flow agents and flow control agents, wetters such as surfactants or catalysts and also thermally conducting fillers, heat-storing fillers or adjuvants which are released by heat or whose release is supported by heat.

Auxiliaries which can be used are all finely ground solid additives such as, for example, chalks, magnesium carbonate, zinc carbonate, kaolin, barium sulphate, titanium dioxide or calcium oxide. Further examples are talc, mica, silica, silicates or zinc oxide. Mixtures of the substances stated may of course also be used.

The pigments employed may be organic or inorganic in nature. All kinds of organic or inorganic colour pigments are suitable, examples being white pigments such as titanium dioxide, for improving the light stability and UV stability, or metal pigments.

Examples of rheological additives are fumed silicas, phyllosilicates (bentonites, for example), high molecular mass polyamide powders or powders based on castor oil derivatives.

Possible examples of adhesion promoter additives include substances from the groups of the polyamides, epoxides or silanes.

Examples of plasticizers for enhancing the adhesion capacity are phthalic esters, trimellitic esters, phosphoric esters, adipic esters and esters of other acyclic dicarboxylic acids, fatty acid esters, hydroxycarboxylic esters, alkylsulphonic esters of phenol, aliphatic, cycloaliphatic and aromatic mineral oils, hydrocarbons, liquid or semi-solid rubbers (for example nitrile rubbers or polyisoprene rubbers), liquid or semi-solid polymers of butene and/or isobutene, acrylic esters, polyvinyl ethers, liquid resins and plasticizer resins based on the raw materials that also constitute the basis for tackifying resins, wool wax and other waxes, silicones and also polymer plasticizers such as polyesters or polyurethanes, for instance.

Adjuvants which are released by heat or whose release is supported by heat are those systems which include an active substance which, as a result of exposure to heat, is released or activated, thereby allowing controlled delivery of this active substance. A suitable active substance in this context is any substance which develops a particular activity on thermal release or activation: for example, a dye, an active medical or cosmetic substance or a detonator (initial explosive). The activity may begin, for instance, as a result of the release of the substance (as in the case of a topically appliable active substance, for example) or on thermal activation, for instance a thermally initiated chemical reaction (for example, a molecular rearrangement, a crosslinking reaction or a decomposition) or a thermally initiated physical process (for example, an adsorption/desorption or a phase transition). The adjuvant which can be released by heat may be, an active medicinal ingredient which is suitable for topical application and which is encapsulated in a meltable matrix.

The formulating of the polymeric material with further constituents such as auxiliaries and plasticizers, for example, is likewise state of the art.

To optimize the technical adhesive properties it is possible to admix a self-adhesive, in accordance with the invention, with resins. Tackifying resins (bond strength enhancer resins) that can be used for addition include, without exception, all of the known tackifier resins described in the literature. Representatives include the pinene resins, indene resins and rosins, their disproportionated, hydrogenated, polymerized and esterified derivatives and salts, the aliphatic and aromatic hydrocarbon resins, terpene resins and terpene-phenolic resins, and also $C_5$ to $C_9$ and other hydrocarbon resins. Any desired combinations of these and additional resins may be used in order to adjust the properties of the resultant adhesive in accordance with requirements. Generally speaking, it is possible to use all resins that are compatible (soluble) with the corresponding base polymer; reference may be made more particularly to all aliphatic, aromatic and alkylaromatic hydrocarbon resins, hydrocarbon resins based on pure monomers, hydrogenated hydrocarbon resins, functional hydrocarbon resins and natural resins. One preferred version uses resins which do not reduce the electrical conductivity and the heatability, even over a prolonged period of time.

A further advantageous embodiment of the planar element can be achieved by adding a heat-storing filler to at least one of the layers. A heat-storing filler is understood in the present case to be any filler having a high heat capacity, more particularly having a heat capacity of more than 0.7 J/gK. As a result of the thermal buffer effect of these substances, it is possible in this way to achieve a uniform profile on heating of the heating layer (and of the contacting layer in thermal contact with it) and also a prolonged and uniform delivery of heat after the end of the active process of heat generation. Fillers with a high heat capacity that can be used with advantage include, for instance, aluminium, beryllium, boron, calcium, iron, graphite, potassium, copper, magnesium, phosphorus or compounds of the aforementioned substances, especially aluminium oxide and aluminium chloride, calcium carbonate, calcium chloride, copper sulphate, magnetite, haematite, magnesium carbonate and magnesium chloride, phosphorus chloride or phosphorus oxide (it also being possible for these substances, furthermore, to fulfil further functions within the planar element, such as potassium or phosphorus in the case of detonators).

It is also advantageous if at least one of the polymeric materials has a high thermal conductivity, more particularly of at least 0.5 W/m·K, very preferably of more than 1 W/m·K. This can be achieved, for instance, by addition of thermally conducting fillers, especially of electrically insulating but highly thermally conducting fillers such as, for instance, boron nitride or aluminium oxide, since the latter do not affect the electrical properties. It is, however, also possible to use electrically conducting fillers with a high thermal conductivity, examples being silver, aluminium or copper. Polymeric materials with particular thermal conductivity allow the energy that is needed to melt a hotmelt polymeric material to be introduced more effectively, leading, for instance, to shortened cycle times when the planar element of the invention is applied to the bonding substrate. When such polymeric materials are used, moreover, a uniform temperature distribution over the entire area of the heating element can be rapidly achieved.

For the purposes of the present invention the composition of the first polymeric material may be identical to or different from the composition of the second polymeric material.

In accordance with the invention the first polymeric material and the second polymeric material must have a sufficiently low resistance and must conduct electric current at least substantially without decomposition. This can be achieved by any of the measures customary for this purpose. For example, the polymeric materials may comprise intrinsically conducting polymers (as base polymer or as additional formulating ingredient). Particularly advantageous, however, is for the polymeric materials to comprise electrically conducting fillers. An electrically conducting (electrically conductive) filler is an admixture to a polymeric material that conducts electric current either on its own (i.e. without polymeric material) or else only in the form of the mixture with the polymeric material.

Electrically conducting fillers which can be used include in principle all suitable electrically conducting fillers which are compatible with the polymeric material in question. Use is made more particularly for this purpose of fillers selected from the group encompassing graphite and carbon black, more particularly conductive carbon black (for example Printex® XE from Degussa), and also any desired combinations thereof. In addition or instead it is also possible with preference to use other carbon-based fillers, more particularly those which are nanoscale, i.e. have an extent in at least one spatial dimension of not more than 500 nm, preferably of less than 200 nm or even of less than 50 nm, examples being carbon nanoparticles such as carbon nanotubes (for example Carbon Nanotubes from Ahwahnee or Carbon Nanotube Masterbatches from Hyperion Catalysis), carbon nanofibres, fullerenes and the like.

Advantageously the filler is used in an amount such that the fraction of the filler in the polymeric material in question is large enough to ensure sufficiently high or low resistance on the part of the polymeric material but on the other hand low enough to have only little adverse effect on the mechanical properties of the first polymeric material. The fillers may additionally be used in surface-modified form. This allows specific influence to be exerted over particular properties of the first polymeric material, in order, for instance, to improve the dispersibility of carbon nanotubes or carbon black in the polymeric material.

Factors governing the conductivity of the polymeric materials include the degree of filling of the electrically conducting filler, in other words its mass fraction within the polymeric material. This has consequences both on the conductivity of the second polymeric material and on the attainable temperature and heating rate of the heating layer. By raising the degree of filling it is possible to achieve higher conductivities and possibly also higher temperatures. The electrical conductivity of a polymeric material is also dependent on its base polymer, moreover. Hence the extent of the effect of the electrical heatability of the first polymeric material may be determined by the degree of filling. The degree of filling is advantageously between 1% and 60% by weight. Greater preference is given to using between 5% and 30% by weight of filler.

In order to obtain an electrically conducting polymeric material, the electrically conducting fillers may be admixed with the monomers of the polymeric material prior to the polymerization and/or during the polymerization, and/or may be combined with the polymers only after the end of the polymerization. Preferably the electrically conducting filler is added after the polymerization to a melt of a base polymer of the polymeric material.

In accordance with the invention the first polymeric material forms the heating layer and the second polymeric material forms the contacting layer. In one preferred embodiment the heating layer has posistor properties, and so it has a positive temperature coefficient and hence exhibits a PTC effect. Preferably, furthermore, the contacting layer does not have posistor properties.

Posistor behaviour results from the choice of a suitable first polymeric material. In this case the first polymeric material may be designed with regard to its positive temperature coefficient and resistance in such a way that, for the particular operating voltage and the particular operating current, the generation of heat in the heating layer is limited by the PTC effect, giving the layer a self-regulating behaviour with regard to the development of heat, and, more particularly, meaning that the layer does not exceed a defined maximum temperature. Overheating of the planar element can be prevented in this way.

In automotive engineering as well, the use of posistor materials of this kind has already become established. For instance, for external car mirrors, PTC elements contacted with aluminium conductor faces, for example, are bonded, and connect the reverse of the mirror glass to a baseplate in the mount of the mirror. When a voltage is then applied to the PTC element, the element heats up as a result of the current flow. The posistors used in the bondable heating elements known from the prior art are typically partially crystalline thermoplastics, such as polyethylene, polyvinylidene fluoride, hexafluoropropylene or tetrafluoroethylene, for instance, that contain carbon black. The state of the art is described in detail in DE 29 48 350 A1, EP 0 307 205 A1, EP 0 512 703 A1 and EP 0 852 801 A1. In their mirror heating utility, these posistors are applied in the form of an ink to a continuous conductor face which serves as electrical contacting electrode and is disposed on a separate carrier sheet with a thickness of typically 75 µm to 250 µm. The solvent present in the ink is removed in a concluding step of drying. Such inks are described comprehensively in EP 0 435 923 A1.

In the first polymeric material for the heating layer it is possible in principle of course to use all polymers having suitable mechanical properties and exhibiting a PTC effect— that is, having posistor behaviour. The occurrence and the extent of a PTC effect are dependent on the formation of a network—for example on whether the electrically conducting filler itself is in agglomerated form or not. The PTC effect here may be assisted by factors, among others, including orientations within the polymeric constituents of the first polymeric material that are introduced in the course of the production operation, by the deliberate introduction, for instance, of an anisotropy with respect to physical properties and/or with respect to the orientation of the macromolecules.

Where a polymeric material with an electrically conducting filler is used as a system with posistor properties, it has proved to be advantageous to use multi-phase systems, more particularly those in which at least one phase undergoes a volume expansion within the temperature range in which the PTC effect occurs, this volume expansion taking place as a result of the heating and being at least partly responsible, according to generally recognized scientific explanation, for the posistor behaviour (see J. Meyer in Polymer Engineering and Science, 13 (1973), pp. 462-468). Multi-phase systems in the sense of the invention are interpreted as including polymeric materials based on polymers or polymer blends which have one or more further fillers in addition to the electrically conducting filler.

Having emerged as being particularly advantageous here in the context of the posistor behaviour is the use of those polymeric materials which have partially crystalline polymers. Partially crystalline polymer systems used may be both single-phase and multi-phase systems, not only homopolymers but also copolymers, especially partially crystalline block copolymers. The partially crystalline polymers may be part of the base polymer itself or else may represent an adjuvant. The crystalline sub-regions of such partially crystalline polymers have a greater thermal expansion when the polymer matrix undergoes softening than do its amorphous regions.

The first polymeric material in the heating layer preferably comprises at least 30% by weight of partially crystalline polymers; even better is a fraction of at least 50% by weight of partially crystalline polymers in the first polymeric material. It has been found that especially with non-adhesive polymeric materials and also with hotmelts as first polymeric material there is a surprisingly sharp increase in the suitability for obtaining the PTC effect as the fraction of partially crystalline polymers goes up. PSAs, in contrast, lose their pressure-sensitive adhesive properties as the partially crystalline fraction goes up, and so, when using PSAs, the fraction of partially crystalline polymers should be kept lower than in the case of hotmelts, in order to ensure a sufficiently high pressure-sensitive adhesiveness.

Non-adhesive polymeric materials and hotmelt adhesives, consequently, are highly suitable beyond expectations for the utilization of the PTC effect. Having emerged as being particularly advantageous in the sense of the invention in this context as a first polymeric material are polymeric materials comprising partially crystalline polymers which are present at 100% by weight in the base polymer of the polymeric material or which are present at least at nearly 100% by weight in the base polymer of the polymeric material.

In a polymeric material as first polymeric material, particularly advantageous partially crystalline polymers are those in which the degree of crystallinity is more than 20% or even more than 40%. The degree of crystallinity can be determined with the aid of dynamic differential calorimetry (Differential Scanning Calorimetry; DSC).

Thus as a first polymeric material it is possible, in the range of partially crystalline thermoplastics, to use polyolefins (low density polyethylene, for example) or copolymers of polyolefins (ethylene-vinyl acetate (EVA), ethylene-acrylic acid (EAA), ethylene-methacrylic acid (EMAA), ethylene-ethyl acrylate or ethylene-butyl acrylate, for example), ionomers, polyamides and/or their copolymers. As well as a sufficiently pronounced PTC effect, these substances also have particularly advantageous hotmelt adhesive properties, and so can be used as a base polymer for a first polymeric material based on a hotmelt adhesive.

Additionally preferred in the range of partially crystalline thermoplastics are acid-modified (with maleic acid or maleic anhydride, for example) polyolefins or their copolymers, since their compatibility with the electrically conducting fillers such as, for instance, carbon black or carbon nanotubes is especially good and since when these polymers are used it is particularly easy to prepare homogeneous dispersions of the filler in the polymer matrix.

Very particularly preferred block copolymers used are styrene block copolymers such as, for instance, SBS (styrene-butadiene-styrene block copolymers), SIS (styrene-isoprene-styrene block copolymers), SEBS (styrene-ethylene-butylene-styrene block copolymers) or SEPS (styrene-ethylene-propylene-styrene block copolymers).

Also advantageous is the addition of polymeric or inorganic fillers which support the PTC effect by melting in the course of heating. These may be, for example, highly crystalline polyolefin waxes or ionic liquids (low-melting metal salts). The choice of the melting point of the fillers also allows the temperature at which posistor behaviour (PTC effect) occurs to be adjusted.

In order to bring about posistor behaviour it is also possible, furthermore, for a combination of different kinds of electrically conducting fillers to be advantageous, since this makes it possible to attain sufficient posistor properties at a very low degree of filling, particularly in the case of the combination of carbon nanotubes with carbon black or graphite.

For increasing the PTC effect, the surface of the electrically conducting fillers, such as of the carbon black particles, may be covered wholly or partly with metals such as nickel, silver or gold, with silanes or with formamides.

The blending of the polymer phase of a polymeric material with the electrically conducting filler may take place by any customary mixing technique. Where, for instance, the polymeric material is applied to the planar element of the invention from the melt, the electrically conducting filler may preferably be introduced directly into the melt. In this case, homogeneous incorporation in the sense according to the invention is desirable. Homogeneous distributions of the filler in the polymeric material are also achieved, preferably, by compounding in twin-screw extruders, continuous kneading apparatus (Buss kneaders, for example) or planetary roller extruders. One advantage of this operation is only brief contamination of the production operation with the separate filler, and also the avoidance of solvents.

The polymeric materials used for the planar elements of the invention are preferably additionally crosslinked. Especially, the aim is to achieve high degrees of crosslinking, in particular for the first polymeric material, having the effect of boosting the PTC effect (compare EP 0 311 142 A1 and also U.S. Pat. No. 4,775,778 A) and are therefore especially suitable. Crosslinking also eliminates or reduces the consequences of a possible NTC (Negative Temperature Coefficient) effect, which is occasionally observed at temperatures above the melting point of a polymeric material.

Accordingly, a base polymer of the first polymeric material may preferably have a degree of crosslinking which corresponds at least to a gel value of 35%, more particularly of more than 60%. The gel value in the present case is the ratio of the fractions of a base polymer that are not soluble in a suitable solvent (toluene or xylene, for example) to the sum of soluble fractions and non-soluble fractions of the base polymer.

A high degree of crosslinking may be obtained, for instance, in a crosslinking step with electron beams. Typical irradiation equipment that may be employed encompasses linear cathode systems, scanning systems (scanner systems) or segmented cathode systems, provided that these are electron beam accelerators. A comprehensive description of the state of the art, and the most important process parameters, are found in Skelhorne, "Electron Beam Processing", in "Chemistry and Technology of UV and EB Formulation for Coatings, Inks and Paints", Vol. 1, 1991, SITA, London. Typical acceleration voltages are situated in the range between 50 kV and 500 kV, preferably in the range between 80 kV and 300 kV. The radiation doses employed range between 5 kGy to 150 kGy, more particularly between 20 kGy and 100 kGy. It is also possible to use other processes which allow high-energy irradiation.

A further possibility, is to bring about a variation in the first polymeric material's electrical conductivity and hence in the thermal heating via the degree of crosslinking. By raising the electron beam dose that is active in a crosslinking reaction (and consequently raising the degree of crosslinking) it is possible generally to raise the electrical conductivity, so that, with a constant flow of current through the heating layer of the planar element, there is an increase in the attainable temperature of the polymeric material. It is likewise possible to control the posistor behaviour of the first polymeric material via the degree of crosslinking.

To reduce the radiation dose needed for a crosslinking reaction it is additionally possible to admix the polymeric materials with crosslinkers and/or crosslinking promoters, more particularly those which are excitable thermally or by means of electron beams. Thermally activable crosslinkers admixed are preferably difunctional or polyfunctional epoxides, hydroxides, isocyanates or silanes. Suitable crosslinkers for electron beam crosslinking include, for instance, difunctional or polyfunctional acrylates or methacrylates, or triallyl cyanurates and triallyl isocyanurates.

The planar element, then, comprises at least one layer within which heat can be generated, and also an electrically conducting layer, which constitutes at least one electrode (one pole) of the contacting layer. It is important here that the heating layer and also the contacting layer are deformable. In the structurally simplest embodiment, a planar element is composed of only two layers: a heating layer, comprising a self-adhesive, and a contacting layer, the latter being able in this structurally simplest embodiment to be either non-adhesive (for a single-sidedly bondable planar element) or else likewise formed as a self-adhesive (for a double-sidedly planar element).

In the embodiment that is the most simple from the standpoint of materials technology, the heating layer and the contacting layer are composed of polymeric materials which differ only with regard to the amount of electrically conducting fillers they contain, but otherwise have an identical composition.

In more complex structures, the planar element of the invention may have further layers in addition to the heating layer and the contacting layer. Thus, for instance, it is possible for the planar element to comprise one or more layers of adhesives, for instance such that the face, out of the two side faces of the contacting layer, that is not in direct contact with the heating layer is itself not of self-adhesive form, but is instead in contact with an additional layer comprising a self-adhesive. A layer of adhesive is any layer which comprises an adhesive and is adapted for the adhesive bonding of the planar element to a substrate. Equally, instead or in addition, a self-adhesive may be provided on the side face of the heating layer that faces away from the contacting layer. Suitable such self-adhesives include in principle all customary and suitable PSAs or hotmelts, more particularly the self-adhesives described above for the first and second polymeric materials, in which case these self-adhesives need then not necessarily be electrically conducting. Accordingly, the planar element of the invention may also comprise, for example, a construction comprising a heating layer and a contacting layer which are both not self-adhesive, and a layer of adhesive may be applied to its side face (heating layer and/or contacting layer) in order to provide for self-adhesion there.

In a further advantageous embodiment at least one layer of the heatable planar element is equipped with a mechanism which on first heating of the planar element leads to an increase in cohesion in the first polymeric material, in the second polymeric material and/or, where appropriate, in further self-adhesives. This may be achieved, for example, via an increase in the crosslinking density as a result of a thermally initiated post-crosslinking, which may be initiated in particular by the (intrinsic) heating of the planar element itself. Advantageously, therefore, a planar element of this kind is used in such a way that first the bond with at least one bonding substrate is produced and then the first heating is performed, in the course of which there is a solidification of the bond.

The planar element is typically of carrier-free form, since this ensures maximum deformability of the planar element overall. Furthermore, however, there may also be a deformable permanent carrier in the planar element. This permanent carrier may be used, for instance, to achieve an overall improvement in the mechanical properties of the planar element, such as its puncture resistance, for example. The permanent carrier may be closed over its full area or of perforate design. As permanent carriers of this kind it is possible to use all suitable carrier materials, such as elastic films or films of thermoplastics, polymer-textile planar elements (for example woven, laid, knitted and nonwoven fabrics) or combinations of such materials.

In order to ensure overall the outstanding planar element deformability to be attained in accordance with the invention, the carrier must, at a stretching velocity of 300 mm/min, have an elongation at break of more than 20%, more particularly of more than 50% or even of more than 100%, and at the same time must further possess a tensile elasticity modulus of less than 1000 MPa or even of not more than 100 MPa.

With respect to polymer-textile carrier systems it should further be noted that these systems do indeed, in accordance with the particular textile make-up, have good or even outstanding three-dimensional deformability (with knits, for example, being much stretchier than wovens). With the improved deformability, these systems are also considerably thicker, since in this case the stretchability is produced not by the fibre material itself but only by the transverse contraction of the polymer-textile assembly, this contraction taking place substantially in the thickness direction. On account of the high thickness and of the dimensional faithfulness of these polymer-textile carrier materials, which is low as a result of the high transverse contraction, film-like materials are generally employed with preference.

It is advantageous in this case if the permanent carrier as well, in addition to its high flexibility, has a high thermal conductivity, more particularly a thermal conductivity of at least 0.5 W/m·K or even of more than 1 W/m·K. Particularly preferred materials are polymers filled with thermally conductive fillers such as boron nitride or aluminium oxide. Permanent carriers of this kind typically have a thickness of less than 50 µm, preferably of less than 25 µm, in order not to detract from the flexibility of the construction as a whole. Through particularly thermally conductive permanent carriers it is possible more effectively to introduce the energy that is needed to melt a hotmelt adhesive, resulting, for instance, in shortened cycle times when the planar element of the invention is applied to the bonding substrate. In one particularly advantageous embodiment the permanent carrier takes the form of a polymeric foam, and thus does not substantially detract from the deformability of the planar element as a whole.

The permanent carrier, moreover, may also be electrically insulating, in order, for instance, to protect the user of the planar element from contact with current-carrying parts of the said element.

The planar element may further have a temporary carrier on one self-adhesive side face and/or optionally also on the other self-adhesive side face. As a temporary carrier of this kind it is possible to use any release-effect liner material, such as a release paper or an in-process liner, which at least partly covers one of the outer self-adhesives. Examples of suitable liner material include all siliconized or fluorinated films having a release effect which are residuelessly redetachable. Film materials that may be mentioned here include, only by way of example, PP (polypropylene), BOPP (biaxially oriented polypropylene), MOPP (monoaxially oriented polypropylene), PET (polyethylene terephthalate), PVC (polyvinyl chloride), PU (polyurethane), PE (polyethylene), PE/EVA (polyethylene-ethylene-vinyl acetate copolymers) and EPDM (ethene-propylene-diene terpolymers). It is also possible, moreover, to use release papers, examples being glassine papers, kraft papers or polyolefinically coated papers. Particular advantage attaches, here as well, to using liner materials which themselves have a high thermal conductivity, more particularly a thermal conductivity of at least 0.5 W/m·K or even of more than 1 W/m·K. Particularly preferred materials are polymers filled with thermally conductive fillers such as boron nitride or aluminium oxide. Through particularly thermally conductive liner materials it is possible more effectively to introduce the energy that is needed to melt a hotmelt adhesive, resulting, for instance, in shortened cycle times when the planar element of the invention is applied to the bonding substrate.

For producing the planar elements of the invention it is possible without exception to employ all known and suitable methods. Thus the polymeric materials of the planar element of the invention can be produced by the familiar methods of producing polymeric planar elements in accordance with the prior art. These include, for instance, flat film extrusion, blown film extrusion, the calender method, and coating from a solution, from a dispersion or from a monomeric or prepolymeric precursor of the polymer. The planar elements thus obtained typically have a total thickness of not more than 1000 µm, more particularly of 10 µm to 400 µm or even of 30 µm to 200 µm.

To produce the planar elements, customarily one of the two polymeric materials is first spread out in the form of a stratum, on a permanent backing or on a production backing—a so-called in-process liner—for instance, which is separated from the planar element again during the process or by no later than the end of the process. The other polymeric material is applied to this layer of polymeric material. Finally, if desired, a further self-adhesive can be applied to the exposed side face of the contacting layer and/or of the heating layer, for which purpose the production carrier can—if necessary—be removed from the polymeric material beforehand.

It is of course also possible to obtain the planar element of the invention in any other production method that deviates from the one above; for example, by applying one of the two polymeric materials to a carrier (production carrier or permanent carrier) and applying the other of the two polymeric materials to another carrier, and then joining the two polymeric materials to one another, in a laminating step, for instance. If desired, a further self-adhesive may then be applied to the permanent carrier or to one of the two polymeric materials, in the latter case only after removal of the temporary carrier.

To apply the second polymeric material of the contacting layer to the first polymeric material or, where appropriate, to a carrier, it is possible to use all of the known methods, such as the application (in a printing process such as screen printing, for example) of electrically conducting inks (conductive inks) and printing inks, conductive varnishes or conductive pastes, in which the polymer is present in dispersion, solution or melt; the transfer of separately shaped polymer layers or polymer films by means of hot stamping, heat sealing, laminative application or the discontinuous application of mixtures of polymers and electrically conducting fillers (polymer/carbon black compounds, for example), in which case the second polymeric material of the contacting layer ought to have a conductivity which is higher by a factor of at least 10 than the conductivity of the intrinsically heatable first polymeric material.

Where the first polymeric material and the second polymeric material are thermoplastic polymers, the planar element may also be produced with a three-dimensional form, which is achieved via the thermoformability of the two layers. A three-dimensionally shaped planar element of this kind may offer advantages in the context of bonding to a correspondingly shaped surface of a bonding substrate.

In accordance with the invention the resulting planar elements are used for connecting two bonding substrates to one another or else for connecting two different sub-regions of a single bonding substrate. If the planar element is of double-sided self-adhesive form, it is adapted for adhesively connecting the surfaces of two bonding substrates to one another. More particularly the planar element finds application for the bonding of bonding substrates in the vehicle industry, and is used, for instance, in cars, buses, trains, boats or aircraft.

The planar element of the invention may be present as part of an adhesively bonded assembly. An adhesively bonded assembly for the present purposes is any assembly, obtained by means of adhesive bonding, of a planar element and at least one bonding substrate which is bonded either to one side face of the planar element directly or via further parts. As a bonding substrate it is advantageous to use a mirror sheet, more particularly the reverse of the mirrored side of a mirror sheet, or, in the case of a transparent planar element, a viewing sheet, such as a display window or a windscreen, for example. Accordingly the planar element of the invention is used for heating an adhesively bonded assembly of this kind.

Thus the planar element of the invention can be used, for instance, as a mirror heater (exterior and interior mirrors), in a heatable inner liner (fastening, sound damping, heating), for heating screenwash or providing an anti-freeze function, for tank heating (especially for diesel vehicles), for the heating of fuel lines (at the same time as fastening), in a heater for deicing systems (wing deicing, possibly including fastening functions), in a steering wheel heater, for warming heating air (additional heating when an engine is cold) or for preheating intake air (combustion air). This list is purely exemplary, and the application of the planar element of the invention is not restricted solely to these specific examples.

Furthermore there are a multiplicity of other applications that can be found, for example (without imposing any restriction as a result of this selection): for preventing condensation or misting on surfaces (for example in the case of bathroom mirrors, for fastening and heating, as an anti-mist lamination for bathroom applications, for instance, or as a heatable tile adhesive sheet, on corrective spectacles or sunglasses or in spectacle cases), as seat heating (in cars, for example, including the integrated application of seat heating and seat occupancy sensor for airbags), for seating at bus stops, in sports stadiums, in outdoor catering or for toilet seats, in electric overblankets or underblankets, in plates for keeping things warm (such as for foods and meals, but also in mountaineering cookers or mountaineering ovens, especially in association with the use of solar cells), in footwear warmers (as an insole, for instance), in band heaters (for pipelines, tanks and the like, for instance), for room heating (for example in wall heaters, floor heaters or else as a foldable tent heater), in water-bed heaters, in heatable housings (for example as a so-called thermobox for conditioning the temperature of the contents of the housing, or in the electronics sector, for instance in interaction with a Peltier element in hi-fi equipment, for ensuring a constant temperature), for motorcycles (for example as steerer heating or saddle heating), as greenhouse heating (for example as large-area radiant heating or convection heating or as small-area local heating directly to the plants, for instance as root heating), for functionally heatable clothing (for example in motorcycle rider clothing, car driver clothing or winter clothing), for heating and, where appropriate, fastening of display systems (for example of LCDs, OLEDs and electrophoretic displays, for instance as anti-freeze protection for displays in cameras or outdoor displays, or in church tower clocks, for instance for their deicing), for heating heated exterior switches, for roof heating (for example as a thawing unit for roofs or gutters), incubators (for example for young animals, for egg hatching or for human babies), in medical therapy (for example in thermotherapy, as heating patches and also for transdermal therapeutic systems and for transdermal drug delivery) or as detonators.

In accordance with the particular self-adhesive used, the planar element is fixed merely under applied pressure to the bonding substrate (in the case of a pressure-sensitive adhesive) or else is fixed to the bonding substrate under applied pressure with introduction of heat (in the case of a hotmelt adhesive). This introduction of heat takes place from the outside; alternatively, however, the heat needed to obtain a stable bond can also be generated intrinsically in the heating layer.

Further advantages and application possibilities will become apparent from the working examples, which are to be described in more detail below with reference to the attached drawings. In those drawings FIG. 1 shows a schematic representation of a longitudinal section through a prior-art, double-sidedly bondable planar element;

Described in the text below first of all are FIGS. 1-6, which, in a general way, show different structures of heated planar elements. After that, by way of example, specific examples are described of the planar element of the invention, and experiments to determine the properties of these planar elements are set out. The results of these experimental measurements are reproduced in FIGS. 7-12.

Figure 1:
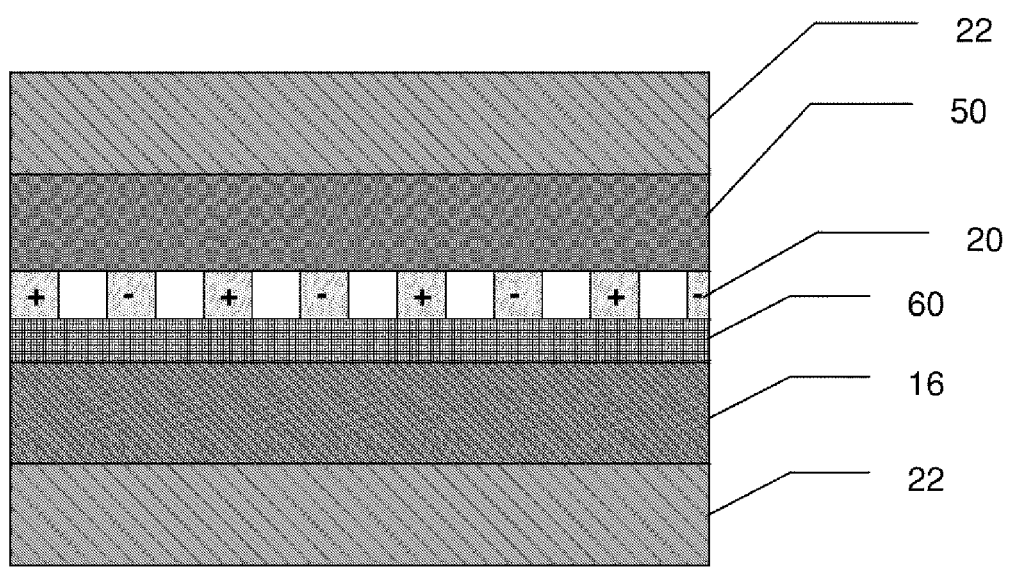

FIG. 1 shows a prior-art planar element having a first heating layer 50 and a contacting layer 20, the contacting layer 20 being connected via a layer 60 of laminating adhesive to a permanent carrier 16. The planar element is of double-sidedly bonding form, with two layers 22 of pressure-sensitive adhesive. A planar element of this kind possesses a relatively complicated multi-ply construction and is neither deformable nor flexible.

Figure 2:
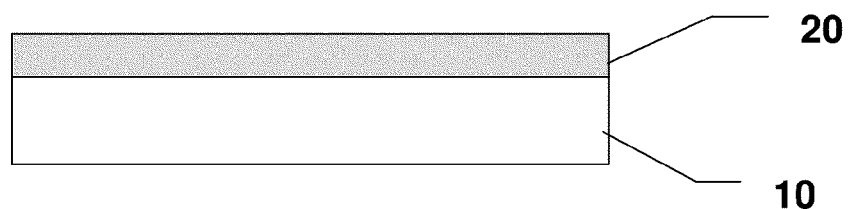
FIG. 2 shows schematic representations of a longitudinal section through an inventive double-sidedly bondable planar element comprising a contacting layer and a heating layer, with sub-figure a) showing the unbonded planar element and sub-figure b) showing the planar element bonded on one side to a mirror glass.
Figure 2:
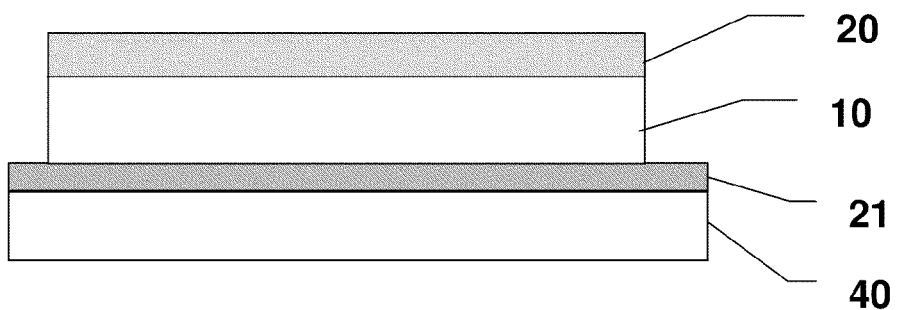

FIG. 2 a) shows an inventive double-sidedly bondable planar element comprising a contacting layer 20 and a heating layer 10. FIG. 2 b) shows this planar element in the single-sidedly bonded state, in the form of an adhesively bonded assembly with a mirror glass, composed of a glass sheet 40 which on one side has a metallic mirror layer 21. In the present case the contacting layer 20 and the heating layer 10 are formed from electrically conducting polymeric materials which are highly elastic and hence deformable. The polymeric material of the heating layer 10, moreover, is formed as a self-adhesive. When the planar element is bonded to the mirror glass, the self-adhesive (i.e. pressure-sensitively adhesive or hotmelt adhesive) heating layer 10 is joined to the reverse of the metallic mirror layer 21. The contacting layer 20 here is a continuous layer of polymeric material, and represents one electrode of the heating layer; the other electrode is formed by the metallic mirror layer 21.

Figure 3:
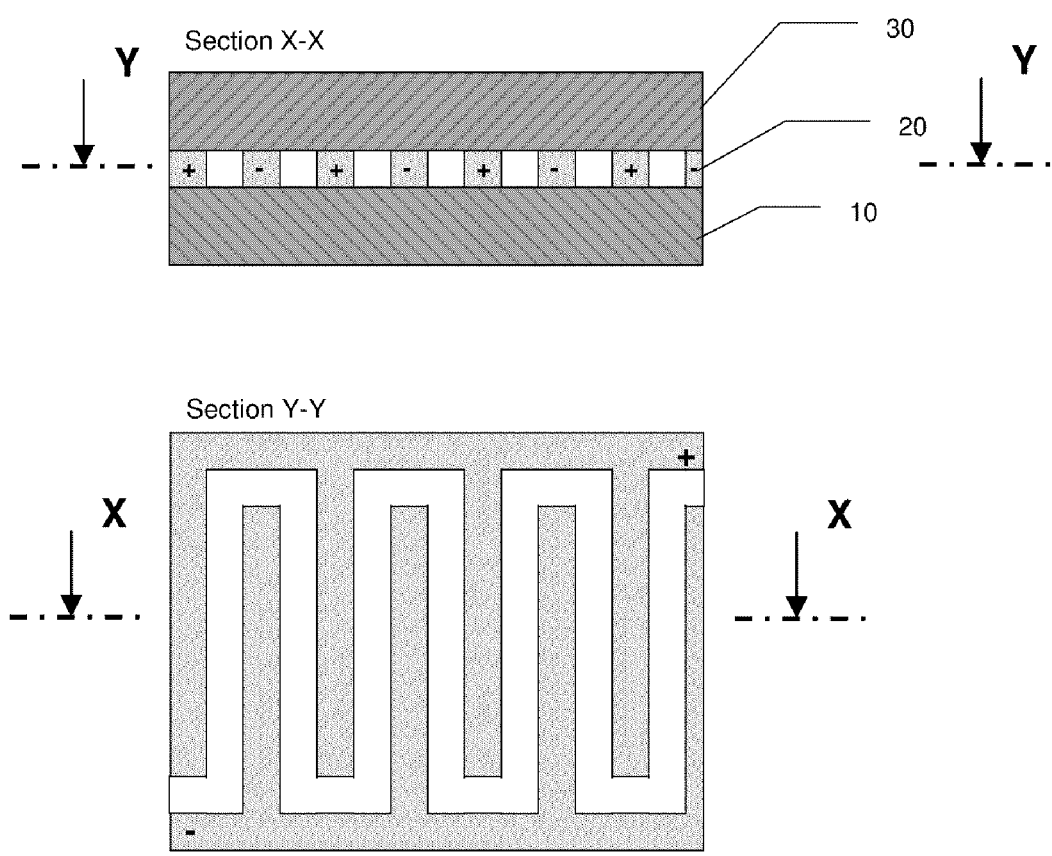
FIG. 3 shows a schematic representation of an inventive double-sidedly bondable planar element comprising a heating layer, a perforate contacting layer with dual comb structure, and a layer of adhesive, the upper sub-figure showing a longitudinal section through the planar element, and the lower sub-figure showing a horizontal section through the planar element.

FIG. 3 shows an inventive double-sidedly bondable planar element having a contacting layer 20 and a heating layer 10, the contacting layer 20 itself being non-adhesive, and, instead, an additional layer 30 of self-adhesive being attached to the contacting layer 20. The contacting layer 20 here has a comb structure of uniform cross section, in which the fingers in the upper subregion branch off on the same side of the main strand as the fingers in the lower subregion. As can be seen from the upper part of FIG. 3, the contacting layer 20 has two unconnected regions, which therefore may serve as the two contact electrodes (poles) of the heating layer (represented by the arbitrarily selected different symbols "+" and "−"). In assembly with a bonding substrate, therefore, there is no need for a further contact electrode as an external counter-electrode.

Figure 4:
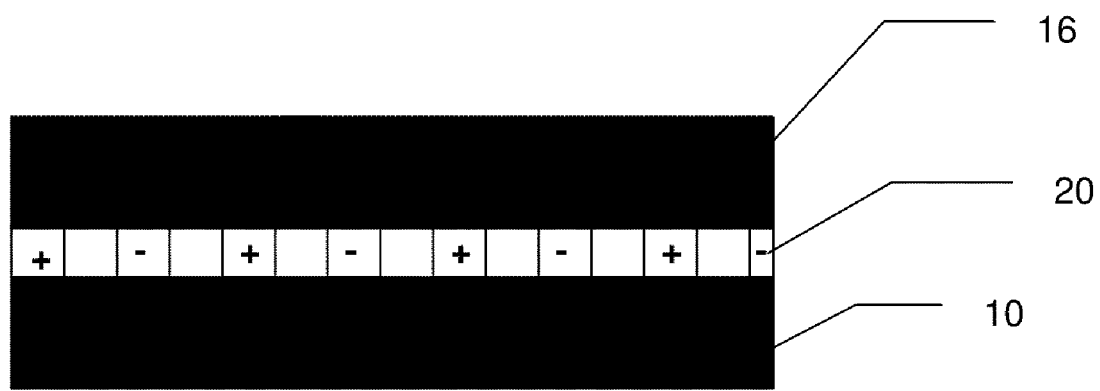
FIG. 4 shows a schematic representation of a longitudinal section through an inventive single-sidedly bondable planar element comprising a carrier, a contacting layer and a heating layer.

FIG. 4 shows an inventive single-sidedly bondable planar element having a contacting layer 20, a heating layer 10 and a deformable permanent carrier 16, the contacting layer 20 and heating layer 10 each being either pressure-sensitively adhesive or hotmelt-adhesive. Here again, the contacting layer 20 has a two-part comb structure, and so, in assembly with a bonding substrate where there is no need for a further contact electrode as an external counter-electrode. In order not to detract too greatly from the elasticity of the construction as a whole, the permanent carrier 16 has a thickness of less than 50 μm, preferably of less than 25 μm.

Figure 5:
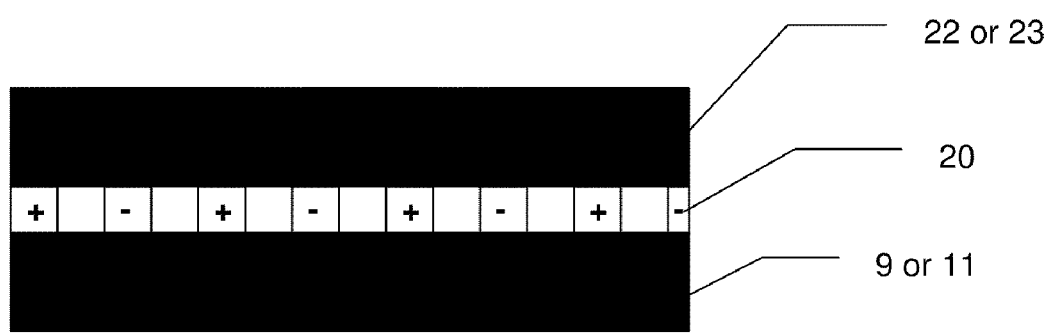
FIG. 5 shows a schematic representation of a longitudinal section through an inventive two-sidedly bondable planar element comprising a layer of adhesive, a contacting layer and a heating layer.

FIG. 5 shows an inventive double-sidedly bondable planar element having a contacting layer 20 and a heating layer 9/11, the contacting layer 20 being not self-adhesive, but additionally a further layer 22/23 of self-adhesive being attached to the contacting layer 20. In contrast to the construction shown in FIG. 3, the heating layer and the further layer of self-adhesive are different kinds of self-adhesives, with the heating layer 9 being of hotmelt form if the other layer 22 of self-adhesive is pressure-sensitively adhesive, or with the heating layer 11 being of pressure-sensitive form if the other layer 23 of self-adhesive is a hotmelt-adhesive layer.

Figure 6:
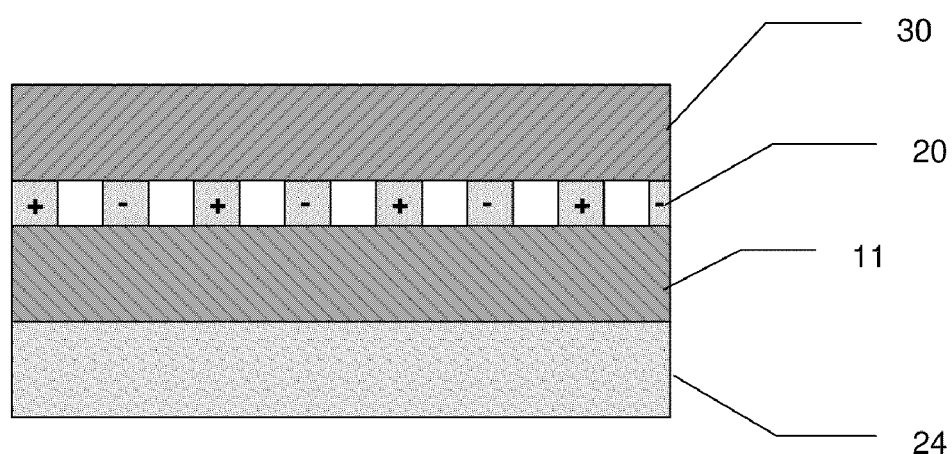
FIG. 6 shows a schematic representation of a longitudinal section through an inventive two-sidedly bondable planar element comprising a layer of adhesive, a contacting layer, heating layer and a temporary carrier.

FIG. 6 shows an inventive double-sidedly bondable planar element having a contacting layer 20 and a pressure-sensitively adhesive heating layer 11, the contacting layer 20 itself being non-adhesive, and instead an additional layer 30 of self-adhesive being attached on the contacting layer 20. In contrast to the construction shown in FIG. 3, this planar element has a temporary carrier 24 which is in contact with the heating layer 11.

The invention is described below by individual, exemplarily selected experiments, without wishing any unnecessary restriction to result from the choice of the samples investigated.

The test methods set out below were employed in order to characterize the planar elements of the invention:

The bond strength of intrinsically heatable pressure-sensitive adhesives (test A) was determined in a peel test on a steel plate at an angle of 180° and with a removal speed of 300 mm/min in line with ASTM D 3330-04. All measurements were conducted at room temperature (23° C.) under climatically aligned conditions (at 50% relative atmospheric humidity).

The bond strength of intrinsically heatable hotmelt adhesives (test B) was determined in a T-peel force test. For this purpose a strip having a thickness of 200 μm of the hotmelt adhesive under test was sealed to an untreated polyester film (Mitsubishi H) using a heating press at a temperature of 140° C. under vacuum. From the composite system thus obtained, a strip having a width of 20 mm was cut and was conditioned under standard conditions for 24 hours. Thereafter, again, the heating film was peeled from the polyester carrier under climatically aligned conditions at room temperature, and the force required to achieve this was recorded. Neither the hotmelt adhesive nor the polyester film was supported or fixed, and so the peel pattern was T-shaped. The results are reported in N/cm as averages from three measurements.

The electrical heatability (test C) was determined for a planar element by measuring the increase in temperature following application of an electrical voltage. The temperature was measured using a Pt100 thermal sensor. The planar element of the invention and the comparative example were applied by their self-adhesive sides to a glass plate. A transformer was used to apply a direct voltage of 12.8 volts to the flexible heating element. After a time of 600 seconds, the temperature was measured directly on the surface of the glass plate. The results are reported in °C.

In the same test, the extent of the PTC effect was determined on the same test specimens; for this purpose, the time profile of the temperature following application of current was recorded. The temperature was measured as described above. In addition, current and voltage were recorded in a time profile, allowing the change in resistance to be calculated therefrom in accordance with Ohm's law.

To determine the flexibility of the planar element (test D), the bowing of a single-sidedly clamped strip, 10 cm long and 2 cm wide, of a planar element under its own weight, in a horizontal position, was measured. This was done using the set-up shown diagrammatically in FIG. 3. FIG. 3 shows an intrinsically heatable planar element comprising a layer 30 of self-adhesive, a contacting layer 20 and a heating layer 10, the contacting layer 20 having a dual comb structure. The test was carried out without liner materials on the PSA faces. For this test the strip was cut out in such a way that the conductor tracks lay substantially transverse to the longitudinal direction of the strip. All measurements were carried out at room temperature under climatically aligned conditions.

To determine the elasticity of the planar element (test E), the tensile elasticity modulus and the elongation at break were determined at room temperature in line with DIN EN ISO 527-3 for a type 5 test specimen and for a stretching velocity of 300 mm/min. At the same time, the electrical resistance of the sample was subjected to at least substantially currentless measurement by means of a laboratory multimeter. At the beginning of measurement, the measuring electrodes were located within the narrow parallel part of the measuring element, at a distance from one another of 25 mm. For further characterization of the stretching behaviour, the electrical resistance of the specimen was recorded additionally during the measurement of the tensile elasticity modulus and of the elongation at break.

As examples of inventive planar elements, planar elements having a pressure-sensitive adhesive or having a hotmelt adhesive as the first polymeric material were produced.

For the intrinsically heatable PSA, first of all a base PSA was prepared in analogy to the disclosure in EP 04 712 016, possessing a comonomer composition of 44.5% by weight of 2-ethylhexyl acrylate, 44.5% by weight of n-butyl acrylate, 8% by weight of methyl acrylate and 3% by weight of acrylic acid. Determination of the molecular weight gave an average molecular weight $M_W$ of 650,000 g/mol with a polydispersity $M_W/M_n$ of 7.0. The resulting base PSA was blended in solution with 40% by weight of graphite (Timcal Timrex KS 6) and then applied by means of a coating bar to a siliconized glassine release paper (Laufenberg). After 10 minutes of drying at 120° C., the thickness of the resulting PSA layer was 100 μm.

This PSA was subsequently crosslinked by electron bombardment. Electron bombardment took place using an instrument from the company Electron Crosslinking AB, Halmstad, Sweden. The coated pressure-sensitive adhesive tape was passed on a chill roll which is present as standard, beneath the Lenard window of the accelerator. The atmospheric oxygen in the bombardment zone was displaced by flushing with pure nitrogen. The belt speed was 10 m/min. The electron beam dose in this case was 50 kGy, with an acceleration voltage of 180 kV for Example 1.

For the intrinsically heatable hotmelt adhesive the base hotmelt used was an ethylene-vinyl acetate copolymer (EVA) of the type Escorene Ultra FL 00728 (ExxonMobil) with a 28% by weight vinyl acetate content. Compounded into this base hotmelt using a Haake Rheomix recording extruder at a temperature of 140° C. and a rotational speed of 120 min$^{-1}$ were 28% by weight of conductive carbon black (Ensaco 260 G; Timecal) over a period of 45 minutes. A planar element having a thickness of 200 μm was produced from the resulting polymer compound by means of a vacuum press.

For a deformable polymeric material of the contacting layer the base hotmelt used was an ethylene-vinyl acetate copolymer (EVA) of the type Escorene Ultra FL 00728 (ExxonMobil) with a 28% by weight vinyl acetate content. Compounded into this base hotmelt using a Haake Rheomix recording extruder at a temperature of 140° C. and a rotational speed of 120 min$^{-1}$ were 28% by weight of conductive carbon black (Printex XE2; Degussa) over a period of 45 minutes. A planar element having a thickness of 200 μm was produced from the resulting polymer compound by means of a vacuum press. From the film thus obtained, a comb-shaped conductor track structure was cut out, with an electrode spacing of 1.5 mm and an electrode width of 5.0 mm, as contacting layer.

For a first non-deformable polymeric material of the contacting layer, using a commercially available dispersion of an electrically conducting polymeric material based on PEDOT/PSS (Clevios F; H. C. Starck), a comb-shaped conductor track structure with an electrode spacing of 1.5 mm and an electrode width of 5.0 mm was applied in a thickness of 5 μm to an in-process liner.

For a second non-deformable polymeric material of the contacting layer, a commercially available conductive silver varnish (Conrad Electronic) was applied in a film thickness of 25 μm to an unfilled ethylene-vinyl acetate film having a thickness of 200 μm.

For Example 1, the construction shown in FIG. 3, using the above-described intrinsically heatable PSA having a thickness of 100 μm as heating layer 10, the above-described base adhesive, subjected to further crosslinking with electron beams under the same conditions as the intrinsically heatable PSA, in a thickness of 75 μm, as layer 30 of self-adhesive, and with the above-described deformable layer of polymeric material with a dual comb structure, as contacting layer 20, was employed. The heatable area had a size of 180 cm$^2$.

For Example 2, the construction shown in FIG. 3, using the above-described intrinsically heatable hotmelt adhesive with a thickness of 200 μm as heating layer 10, the above-described base PSA with a thickness of 75 μm as layer 30 of self-adhesive, and the above-described deformable layer of polymeric material with dual comb structure, as contacting layer 20, was used. The heatable area had a size of 180 cm$^2$.

For Comparative Example 1, a commercially available posistor heating element according to the prior art, from an external mirror from Porsche, was used.

For the above-described base PSA and also for the above-described heatable PSA, the bond strength was determined in accordance with test A:

| base PSA: | 7.4 N/cm |
|---|---|
| heatable PSA: | 6.3 N/cm |

The results of these tests show that admixing a conductive filler to the base PSA leaves its pressure-sensitive adhesive properties largely retained.

The peel force was determined for the above-described base hotmelt and also for the above-described heatable hotmelt in accordance with test B:

| base hotmelt: | 4.5 N/cm |
|---|---|
| heatable hotmelt: | 2.9 N/cm |

The results of these tests show that admixing a conductive filler to the base hotmelt leaves its hotmelt-adhesive properties largely retained.

The heatability and the PTC effect were determined for Example 1 and Example 2 and also for Comparative Example 1 in accordance with test C. The temperatures attained by the planar elements were as follows:

| Example 1: | 53° C. |
|---|---|
| Example 2: | 54° C. |
| Comparative Example 1: | 54° C. |

The results of these tests show that the inventive planar elements achieve a heating performance which matches the heating performance of prior-art car mirror heating systems presently available on the market.

Figure 7:
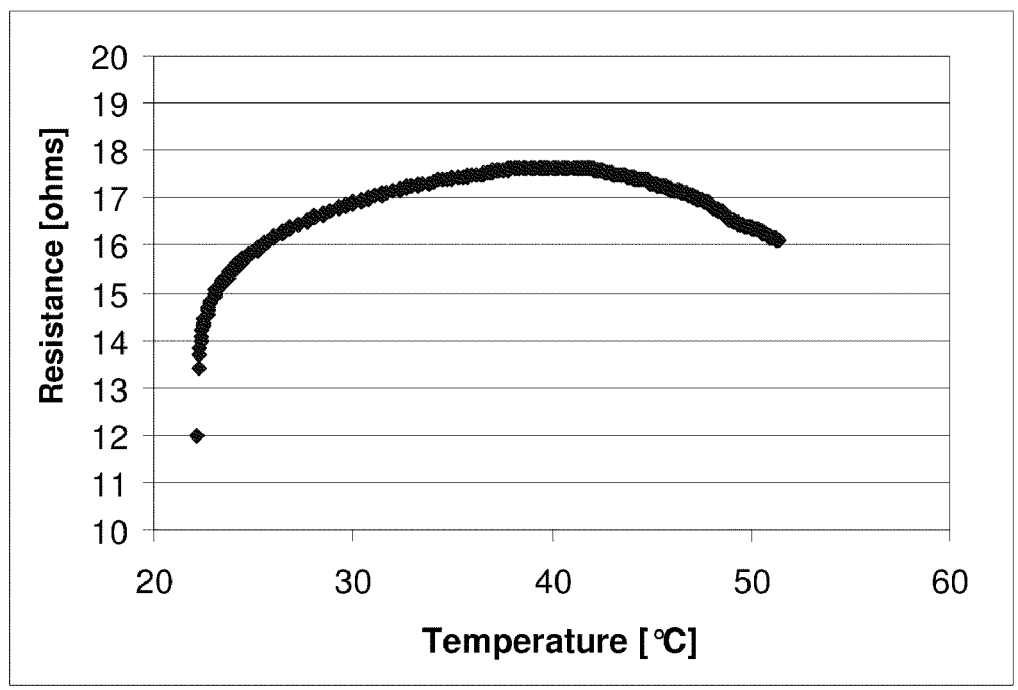
FIG. 7 shows a data curve which reproduces the Ohmic resistance of an inventive planar element (Example 1) determined for different temperatures.
Figure 8:
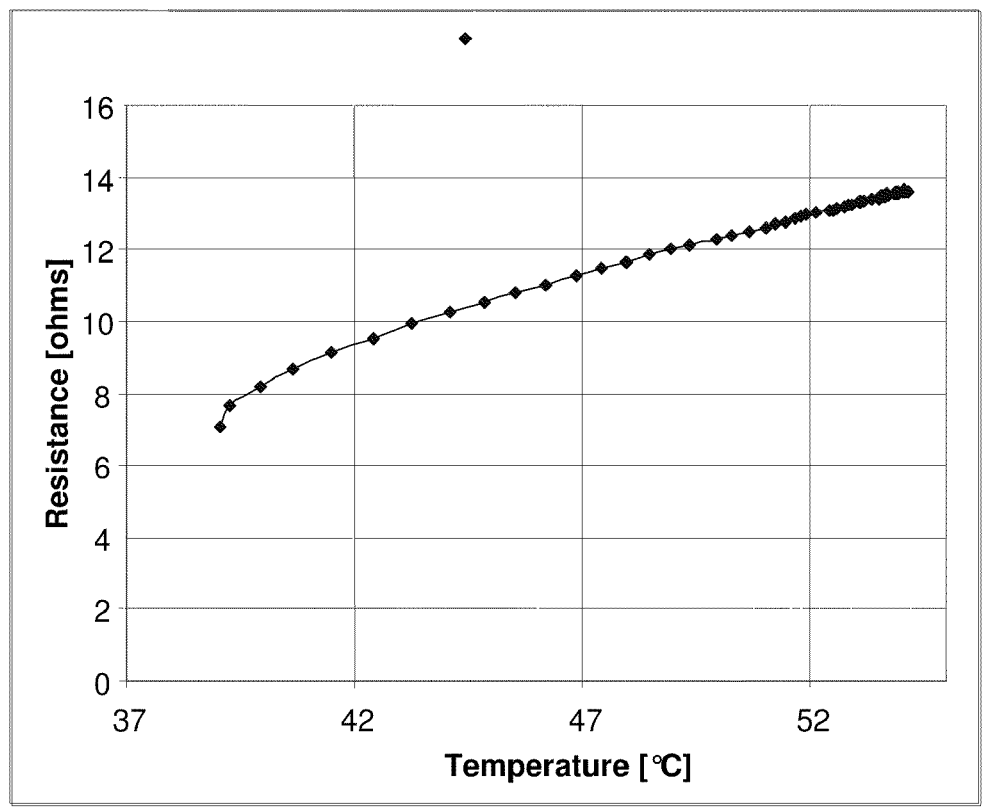
FIG. 8 shows a data curve which reproduces the Ohmic resistance of an inventive planar element (Example 2) determined for different temperatures.
Figure 9:
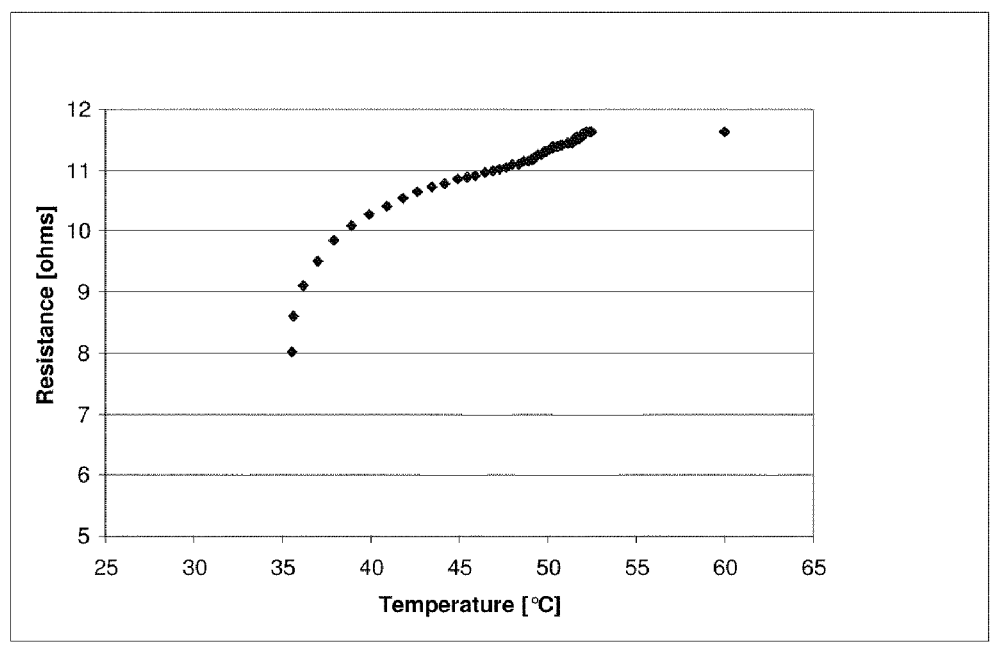
FIG. 9 shows a data curve which reproduces the Ohmic resistance of a conventional planar element (Comparative Example 1) determined for different temperatures.

The overall resistance of the planar element, calculated from the instantaneous current and the respective instantaneous voltage, from test C, is shown in FIG. 7, FIG. 8 and FIG. 9 as a function of the temperature. The shape of the curve obtained from these calculations offers indications of the PTC effect of the heating layers. FIG. 7 shows the results for Example 1, FIG. 8 the results for Example 2 and FIG. 9 the results for Comparative Example 1.

In FIG. 7 it can be seen that the resistance increases sharply up to a temperature of around 40° C. and decreases slightly towards higher temperatures. Example 1, then, at temperatures below about 40° C., has a pronounced posistor behaviour and at temperatures above 40° C. exhibits a slight NTC effect. Example 2 (FIG. 8) exhibits pronounced posistor behaviour over the entire temperature range investigated. Comparative Example 1 (FIG. 9) has posistor behaviour over the entire temperature range investigated. When the data curves obtained in these measurements are compared, it is apparent that the PTC effect is in some cases even more pronounced for the planar elements of the invention (FIG. 7 and FIG. 8) than for the commercial comparative example (FIG. 9).

The deformability of the planar elements was determined in accordance with test D for Example 1 (with the above-described heatable PSA) and for Example 2 (with the above-described heatable hotmelt) and also for Comparative Example 1. The bowings measured were as follows:

| | |
|---|---|
| Example 1: | 75 mm |
| Example 2: | 60 mm |
| Comparative Example 1 | 15 mm |

The results of these tests show that the planar elements of the invention have a considerably higher flexibility than the planar elements known from the prior art.

The deformability of the planar elements was determined in accordance with test E, on the basis of the tensile elasticity modulus and the elongation at break, for the intrinsically heatable PSA (base PSA), the intrinsically heatable hotmelt (base hotmelt), the deformable polymeric material, the first non-deformable polymeric material (polymeric material based on PEDOT/PSS) and the second non-deformable polymeric material (conductive silver varnish). In these investigations, the tensile elasticity moduli and elongations at break determined for the samples were as follows:

| Sample | Elasticity modulus | Elongation at break |
|---|---|---|
| intrinsically heatable PSA | 2.2 MPa | 424% |
| intrinsically heatable hotmelt | 35.6 MPa | 306% |
| deformable polymeric material | 63 MPa | 367% |
| first non-deformable polymeric material | not determinable | [<10%] |
| second non-deformable polymeric material | not determinable | [≈25%] |

The results of these tests show that the polymeric materials of the invention have a considerably lower elasticity modulus and a considerably higher elongation at break than the polymeric materials known from the prior art.

Thus for the conventional adhesives (first and second non-deformable polymeric materials) it was not even possible to determine the tensile elasticity modulus, since they were so brittle that the specimens ruptured even during the clamping-in of the self-supporting layers. For these samples (first and second non-deformable polymeric materials) therefore, it was also not possible to determine the elongation at break precisely; however, it was possible to determine this parameter approximately, by applying the non-deformable polymeric materials to an elastic, electrically non-conducting, auxiliary carrier and determining the change in the electrical resistance of the non-deformable polymeric materials with the auxiliary carrier being stretched.

For each of the brittle materials, a massive increase in electrical resistance occurred at a particular stretch. This increase was interpreted as the breaking (rupturing) of the layers of the non-deformable polymeric materials, which was taken as a basis for the corresponding theoretical elongation at break. In this way, an elongation at break of less than 10% was determined for the first non-deformable polymeric material, whereas the elongation at break of the second non-deformable polymeric material was approximately 25%.

Consequently, although the second non-deformable polymeric material has an elongation at break which is within the inventively required range of more than 20%, this system fails to meet the requirement of a tensile elasticity modulus of less than 1000 MPa. This result shows that, in order to bring about the effect according to the invention, it is not enough for the polymeric materials to exhibit only one of the two features (elongation at break and tensile elasticity modulus); instead, it is mandatory for both polymeric materials to realize both features simultaneously in each case.

Figure 10:
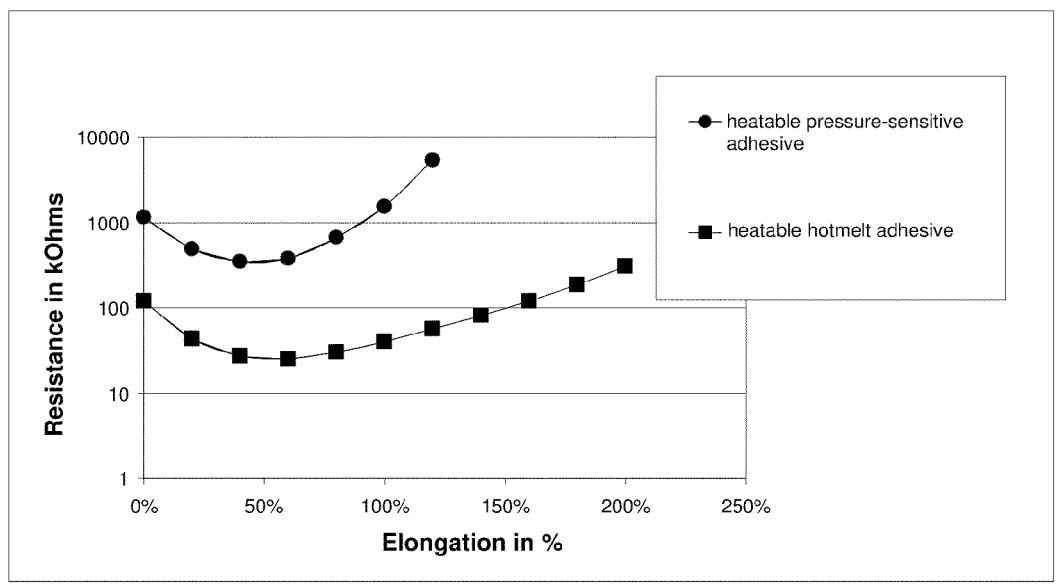
FIG. 10 shows two data curves, which show the Ohmic resistance of heating layers of inventive planar elements determined for different levels of stretching, in a logarithmic representation.
Figure 11:
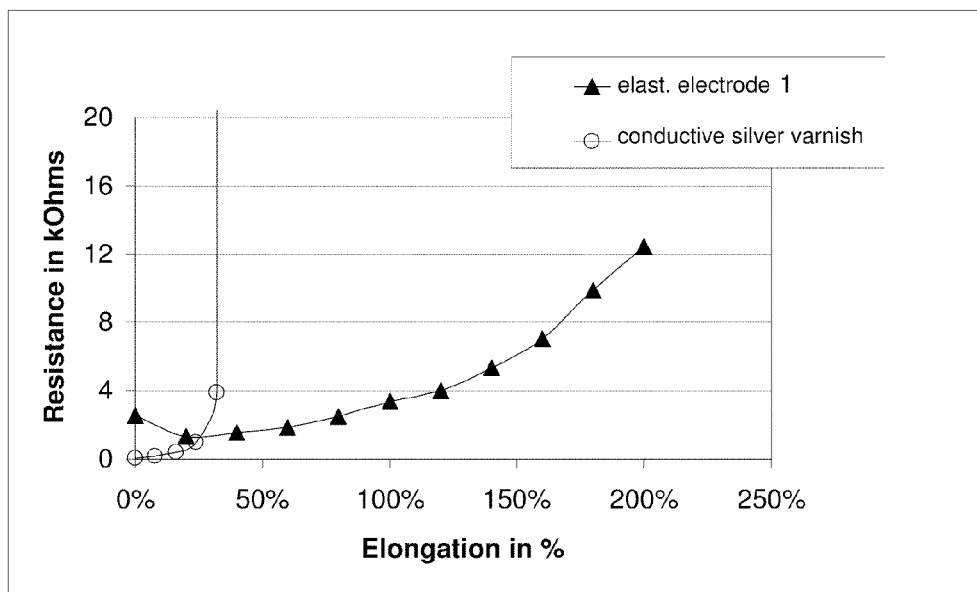
FIG. 11 shows two data curves, showing the Ohmic resistance of the contacting layer of an inventive planar element and of a conventional contacting layer determined for different levels of stretching.
Figure 12:
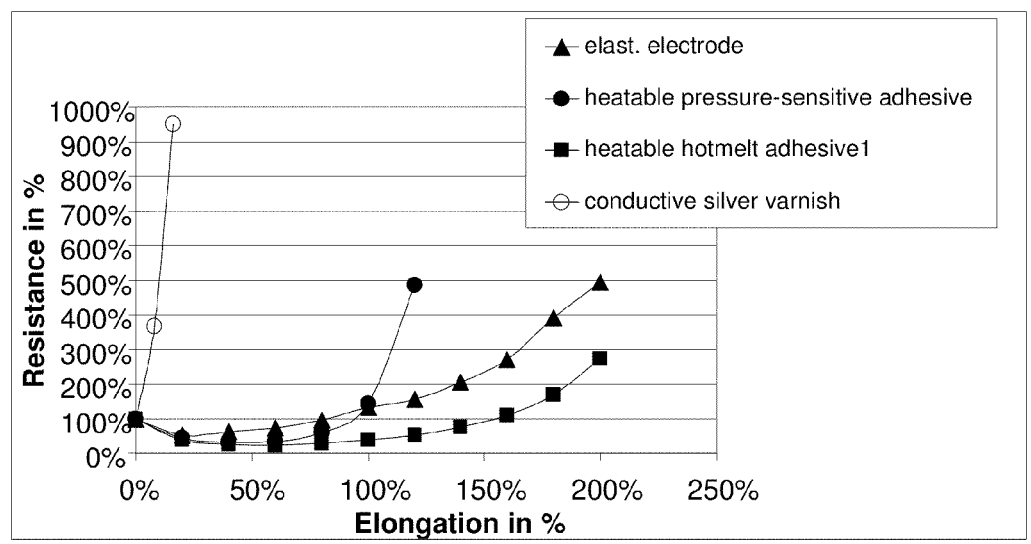
FIG. 12 shows four data curves, showing the relative changes in Ohmic resistance of the layers shown in FIG. 10 and FIG. 11, determined for different levels of stretching.

The resistances of the specimens, measured in the course of the measurement of the tensile elasticity modulus and of the elongation at break at different levels of stretch, are shown in FIG. 10, FIG. 11 and FIG. 12. The initial values prior to stretching (i.e. at a stretch of zero) for the electrical resistance were as follows:

| | |
|---|---|
| intrinsically heatable PSA | 1.15 MΩ |
| intrinsically heatable hotmelt | 118 kΩ |
| deformable polymeric material | 2.6 kΩ |
| first non-deformable polymeric material | 90 Ω |
| second non-deformable polymeric material | 50 Ω |

FIG. 10 shows the change in electrical resistance when the specimen is stretched, for the two intrinsically heatable adhesives from which a heating layer may be formed in accordance with the invention. At a low stretch of up to about 50% (based on the initial dimensions), of the kind that typically occurs in practical use, a decrease in resistance is observed. Only at a very high stretch, of more than 50%, is there an increase in the resistance, which can be attributed to a reduction in the cross section under extreme stretching (such severe stretching, however, ought not to be of any importance in practice in general when bonding to an uneven substrate, since the planar elements are not stretched so severely). The initially measured resistance is exceeded only at a stretch of 90% (PSA) or, indeed, 150% (hotmelt). At a stretch of 100%, however, both samples still have resistances which are well below twice the resistance measured initially.

FIG. 11 shows the change in electrical resistance on stretching of the specimen for the deformable polymeric material ("elast. electrode"), from which a contacting layer may be formed in accordance with the invention, and for the second non-deformable polymeric material (conductive silver varnish). The deformable polymeric material shows a slight decrease in electrical resistance up to a stretch of about 25%, while at greater stretches an increase in the electrical resistance is observed. Corresponding to the application of this polymeric material as a contacting layer, the absolute value of the resistance is lower by more than one order of magnitude than in the case of the data curves shown in FIG. 10 for the polymeric materials for the heating layer. The conductive silver varnish, in contrast, shows a massive increase in electrical resistance on stretching of more than 25%, which was interpreted as breaking of the varnish film.

FIG. 12 shows in summary form the data curves depicted in FIGS. 10 and 11, as data curves related to the respective initial resistance, and thus, accordingly, shows the relative change in electrical resistance. It can be seen that, for all of the polymeric materials which can be used in the planar element of the invention, in contrast to the conductive silver varnish, the resistance, even at stretches of 100%, does not exceed two times the original initial value, and so all of these polymeric materials allow a flow of current through the polymeric material (with heating effect where appropriate).

The results of these tests show that the planar elements of the invention exhibit a considerably higher deformability than the planar elements known from the prior art, without any collapse in the structure of this layer and of the associated functionality (electrical conductivity).

Accordingly, the exemplary experiments described above demonstrate the outstanding suitability of the flexible planar elements of the invention for obtaining a stable, heatable adhesive bond.

The invention claimed is:

1. Self-adhesive planar element comprising a heating layer and a contacting layer, the heating layer being in contact with one of two side faces of the contacting layer and being in electrically conducting communication therewith, and being composed of an intrinsically heatable first polymeric material formed as a conductor which heats up when an electric current is passed through, wherein the contacting layer is comprised of an electrically conducting second polymeric material, the first polymeric material and the second polymeric material each being a polymeric material based on elastomers and/or on plastic polymers, and each having, at a stretching velocity of 300 mm/min and a temperature of 23° C., an elongation at break of more than 20%, and further possessing a tensile elasticity modulus of less than 1000 MPa.

2. The self-adhesive planar element according to claim 1, wherein at least one the first or second polymeric material is a self-adhesive.

3. The self-adhesive planar element according to claim 2, wherein the self-adhesive is a pressure-sensitive adhesive based on acrylates and/or methacrylates, polyurethanes, natural rubbers, synthetic rubbers and/or silicones.

4. The self-adhesive planar element according to claim 2, wherein the self-adhesive is a hotmelt adhesive based on polyolefins and copolymers of polyolefins and/or on their acid-modified derivatives, on ionomers, on thermoplastic polyurethanes, on polyamides and their copolymers and/or on block copolymers.

5. The self-adhesive planar element according to claim 1, wherein the planar element further comprises a layer of adhesive comprising a self-adhesive, which is in contact with the other of the two side faces of the contacting layer.

6. The self-adhesive planar element according to claim 1, wherein the first polymeric material is a posistor.

7. The self-adhesive planar element according to claim 1, wherein the second polymeric material is not a posistor.

8. The self-adhesive planar element according to claim 1, wherein the electrical resistance of the contacting layer is less than one tenth of the electrical resistance of the heating layer.

9. The self-adhesive planar element according to claim 1, wherein the electrical resistance of the contacting layer, when the contacting layer is stretched by more than 20% goes up by not more than three times.

10. The self-adhesive planar element according to claim 1, wherein the contacting layer has a branched comb structure or finger structure.

11. The self-adhesive planar element according to claim 1, wherein at least one of the first or second polymeric material comprise at least one electrically conducting filler.

12. The self-adhesive planar element according to claim 11, wherein the electrically conducting filler is selected from the group consisting of metal particles, graphite, carbon nanoparticles carbon black, and conductive carbon black.

13. The self-adhesive planar element according to claim 1, wherein the planar element is of carrier-free form.

14. The self-adhesive planar element according to claim 1, wherein the planar element comprises a carrier which, at a stretching velocity of 300 mm/min and a temperature of 23° C., has an elongation at break of more than 20%, and further has a tensile elasticity modulus of less than 1000 MPa.

15. Adhesively bonded assembly comprising a bonding substrate and a planar element according to claim 1, wherein the bonding substrate is a viewing sheet or mirror sheet.

16. The self-adhesive planar element of claim 1 wherein the polymeric materials have, at a stretching velocity of 300 mm/min and a temperature of 23° C., and elongation at break of more than 50%.

17. The self-adhesive planar element of claim 1 wherein the tensile elasticity modulus is not more than 100 MPa.

18. The self-adhesive planar element of claim 4 wherein the block copolymer is a styrene block copolymer.

* * * * *